United States Patent
Ham et al.

(10) Patent No.: US 12,518,840 B2
(45) Date of Patent: Jan. 6, 2026

(54) NONVOLATILE MEMORY DEVICE SUPPORTING GIDL ERASE OPERATION

(71) Applicant: Samsung Electronics Co., Ltd., Suwon-si (KR)

(72) Inventors: Dae Sik Ham, Suwon-si (KR); Yong-Wan Son, Suwon-si (KR); Sang-Hyun Joo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 211 days.

(21) Appl. No.: 18/364,126

(22) Filed: Aug. 2, 2023

(65) Prior Publication Data

US 2024/0145017 A1     May 2, 2024

(30) Foreign Application Priority Data

Oct. 27, 2022   (KR) .................... 10-2022-0140365

(51) Int. Cl.
| | | |
|---|---|---|
| *G11C 16/34* | (2006.01) | |
| *G11C 16/04* | (2006.01) | |
| *G11C 16/16* | (2006.01) | |
| *G11C 16/22* | (2006.01) | |

(52) U.S. Cl.
CPC ...... *G11C 16/3495* (2013.01); *G11C 16/0483* (2013.01); *G11C 16/16* (2013.01); *G11C 16/22* (2013.01); *G11C 16/349* (2013.01); *G11C 16/344* (2013.01)

(58) Field of Classification Search
CPC ..... G11C 16/3495; G11C 16/16; G11C 16/22; G11C 16/344; G11C 16/349; G11C 16/0483; G11C 7/18; G11C 8/14; G11C 16/30

See application file for complete search history.

(56) References Cited

U.S. PATENT DOCUMENTS

| | | | |
|---|---|---|---|
| 8,885,412 B2 | 11/2014 | Li et al. | |
| 8,891,308 B1 | 11/2014 | Ou et al. | |
| 9,281,070 B2* | 3/2016 | Nam ................ | G11C 16/08 |
| 9,424,940 B1* | 8/2016 | Choo ................ | G11C 16/30 |
| 9,558,834 B2* | 1/2017 | Choe ................ | G11C 7/04 |

(Continued)

FOREIGN PATENT DOCUMENTS

| | | |
|---|---|---|
| KR | 101606168 B1 | 3/2016 |
| KR | 10-2021-0028307 A | 3/2021 |

*Primary Examiner* — Amir Zarabian
*Assistant Examiner* — Justin Bryce Heisterkamp
(74) *Attorney, Agent, or Firm* — HARNESS, DICKEY & PIERCE, P.L.C.

(57) ABSTRACT

A memory device includes a memory cell array including a plurality of memory blocks, a voltage generator configured to generate an erase voltage and row line voltages to be provided to a target block from among the plurality of memory blocks, in which an erase operation is to be performed, and control logic configured to control the memory cell array and the voltage generator. The voltage generator is configured to provide the erase voltage to at least one of a bit line and a common source line connected with the target block and to provide the row line voltages to row lines connected with the target block, and the control logic is configured to change a slope of the erase voltage and a floating time of at least one row line among the row lines depending on a program/erase cycle.

20 Claims, 36 Drawing Sheets

(56) References Cited

U.S. PATENT DOCUMENTS

| | | | |
|---|---|---|---|
| 10,008,277 B2 | 6/2018 | Pang et al. | |
| 10,847,226 B2 | 11/2020 | Kim et al. | |
| 11,114,165 B2 | 9/2021 | Hwang et al. | |
| 2011/0013461 A1* | 1/2011 | Shiino | G11C 16/3445 365/185.29 |
| 2015/0003170 A1* | 1/2015 | Kim | G11C 16/0483 365/185.29 |
| 2016/0188231 A1* | 6/2016 | Mittelholzer | G06F 3/0688 714/704 |
| 2019/0348121 A1* | 11/2019 | Kim | G11C 16/0483 |
| 2020/0143888 A1* | 5/2020 | Rabkin | H10B 43/27 |
| 2020/0286565 A1* | 9/2020 | Bayle | G11C 16/32 |
| 2020/0394114 A1* | 12/2020 | Lee | G06F 12/0882 |
| 2021/0065809 A1* | 3/2021 | Hwang | G11C 11/5635 |
| 2021/0391017 A1* | 12/2021 | Choi | G11C 16/0483 |
| 2022/0076750 A1* | 3/2022 | Park | G11C 16/14 |
| 2023/0402103 A1* | 12/2023 | Lai | G11C 16/3477 |

* cited by examiner

FIG. 16

|  | DWL | GSLa | GIDL1a |
|---|---|---|---|
| Initial P/E Cycle | 17V | 2V | 0V |
| ... | ... | ... | ... |
| Mth P/E Cycle | 15V | 2V | 0V |
| M+1th P/E Cycle | 13V | 1.5V | 0V |
| M+2th P/E Cycle | 11V | 1V | 0V |
| M+3th P/E Cycle | 9V | 0.5V | 0V |
| M+4th P/E Cycle | 7V | 0V | 0V |

[Difference between WL and CH potential]

[M+4th Cycle]

|  | DWL | GSL1a | GIDL1a |
|---|---|---|---|
| Initial P/E Cycle | 17V | 2V | 0V |
| ... | ... | ... | ... |
| Mth P/E Cycle | 15V | 2V | 0V |
| M+1th P/E Cycle | 12V | 1V | 0V |
| M+2th P/E Cycle | 5V | 0V | 0V |

[Difference between WL and CH potential]

FIG. 24

|  | DWL | GSL1a | GIDL1a |
|---|---|---|---|
| Initial P/E Cycle | 0V | 0V | 0V |
| ... | ... | ... | ... |
| Mth P/E Cycle | 17V | 2V | 0V |
| M+1th P/E Cycle | 15V | 2V | 0V |
| M+2th P/E Cycle | 13V | 1.5V | 0V |
| M+3th P/E Cycle | 11V | 1V | 0V |
| M+4th P/E Cycle | 9V | 0.5V | 0V |
| M+5th P/E Cycle | 7V | 0V | 0V |

[Difference between WL and CH potential]

FIG. 37

UIB ADDR Table

| Memory ADDR | UIB ADDR | User Access |
|---|---|---|
| R1 | 0x0001 | O |
| R2 | 0x0002 | O |
| R3 | 0x0003 | O |
| R4 | 0x0004 | O |
| R5 | 0x0005 | O |
| R6 | 0x0006 | O |
| R7 | 0x0007 | O |
| R8 | 0x0008 | O |
| ... | ... | ... |

FIG. 41

UIB ADDR Table

| Memory ADDR | UIB ADDR | A1 ADDR | User Access |
|---|---|---|---|
| R1 | 0x0001 | 00001 | O |
| R2 | 0x0002 | | X |
| R3 | 0x0003 | | X |
| R4 | 0x0004 | | X |
| R5 | 0x0005 | 00002 | O |
| R6 | 0x0006 | 00003 | O |
| R7 | 0x0007 | | X |
| R8 | 0x0008 | 00004 | O |
| | ... | ... | ... |

NONVOLATILE MEMORY DEVICE SUPPORTING GIDL ERASE OPERATION

CROSS-REFERENCE TO RELATED APPLICATIONS

This application claims priority under 35 U.S.C. § 119 to Korean Patent Application No. 10-2022-0140365 filed on Oct. 27, 2022 in the Korean Intellectual Property Office, the disclosure of which is incorporated by reference herein in its entirety.

BACKGROUND

Various example embodiments described herein relate to a semiconductor device, and more particularly, relate to nonvolatile memory device of a three-dimensional structure.

A memory device is used to store data and may be classified as a volatile memory device or a nonvolatile memory device. As an example of the nonvolatile memory device, a flash memory device may be used in one or more of a mobile phone, a digital camera, a portable computer device, a stationary computer device, and any other device. Nowadays, as an information communication device supports various functions, a high-capacity and highly-integrated memory device is required or expected. As such, a three-dimensional (3D) nonvolatile memory device that includes a plurality of word lines stacked on a substrate in a vertical direction is being developed. Nowadays, a gate induced drain leakage (GIDL) erase scheme is being developed as one of erase schemes for the 3D nonvolatile memory device. However, the GIDL erase scheme may cause reduction of an on-off characteristic of a selection transistor, due to the generation of hot carriers.

SUMMARY

Various example embodiments provide a nonvolatile memory device capable of preventing or reducing the likelihood of and/or impact from generation of hot carriers in a GIDL erase operation.

According to some example embodiments, a memory device includes a memory cell array including a plurality of memory blocks, a voltage generator configured to generate an erase voltage and row line voltages to be provided to a target block from among the plurality of memory blocks, the target block being a block in which an erase operation is to be performed, and control logic configured to control the memory cell array and the voltage generator. The voltage generator is configured to provide the erase voltage to at least one of a bit line and a common source line connected with the target block and to provide the row line voltages to row lines connected with the target block, and the control logic is configured to change a slope of the erase voltage and to change a floating time of at least one row line among the row lines, the change in the slope and in the floating time being dependent on a number of executed program/erase cycles.

Alternatively or additionally, according to some example embodiments, a data storage device includes a memory device, and a memory controller configured to control the memory device. The memory device includes a memory cell array including a plurality of memory blocks, a voltage generator configured to generate an erase voltage and row line voltages to be provided to a target block from among the plurality of memory blocks, the target block being a block in which an erase operation is to be performed, and control logic configured to control the memory cell array and the voltage generator. The memory controller is configured to control the memory device such that at least one of a slope of the erase voltage and a floating time of at least one row line among the row lines is changed.

Alternatively or additionally, according to some example embodiments, an erase method of a nonvolatile memory device which includes at least one string vertically on a substrate includes selecting a target block, in which an erase operation is to be performed, from among a plurality of memory blocks, changing an erase condition based on a number of executed program/erase cycles of the target block, and performing an erase operation on the target block based on the changed erase condition.

BRIEF DESCRIPTION OF THE FIGURES

The above and other objects and features of various example embodiments will become apparent by describing in detail embodiments thereof with reference to the accompanying drawings.

FIGS. 16 to 19 are diagrams for describing various example embodiments in which a detect level of a dummy word line is adjusted based on the number of executed P/E cycles.

FIG. 22 is a flowchart illustrating an example of an erase operation of various example embodiments, in which a detect level decreases as a P/E cycle progresses.

FIGS. 23 and 24 are diagrams for describing another embodiment of various example embodiments in which a detect level of a dummy word line is adjusted based on the number of executed P/E cycles.

FIG. 37 is a diagram illustrating an example of the UIB address table 1213 stored in the memory controller 1200 of FIG. 35.

FIG. 41 is a diagram illustrating an example of the UIB address table 1194 stored in the memory device 1100 of FIG. 40.

DETAILED DESCRIPTION

Below, various example embodiments will be described in detail and clearly to such an extent that one of ordinary skill in the art may easily implement various example embodiments.

[Data Storage Device Adjusting Erase Condition Based on Program/Erase Cycle]

Figure 1:
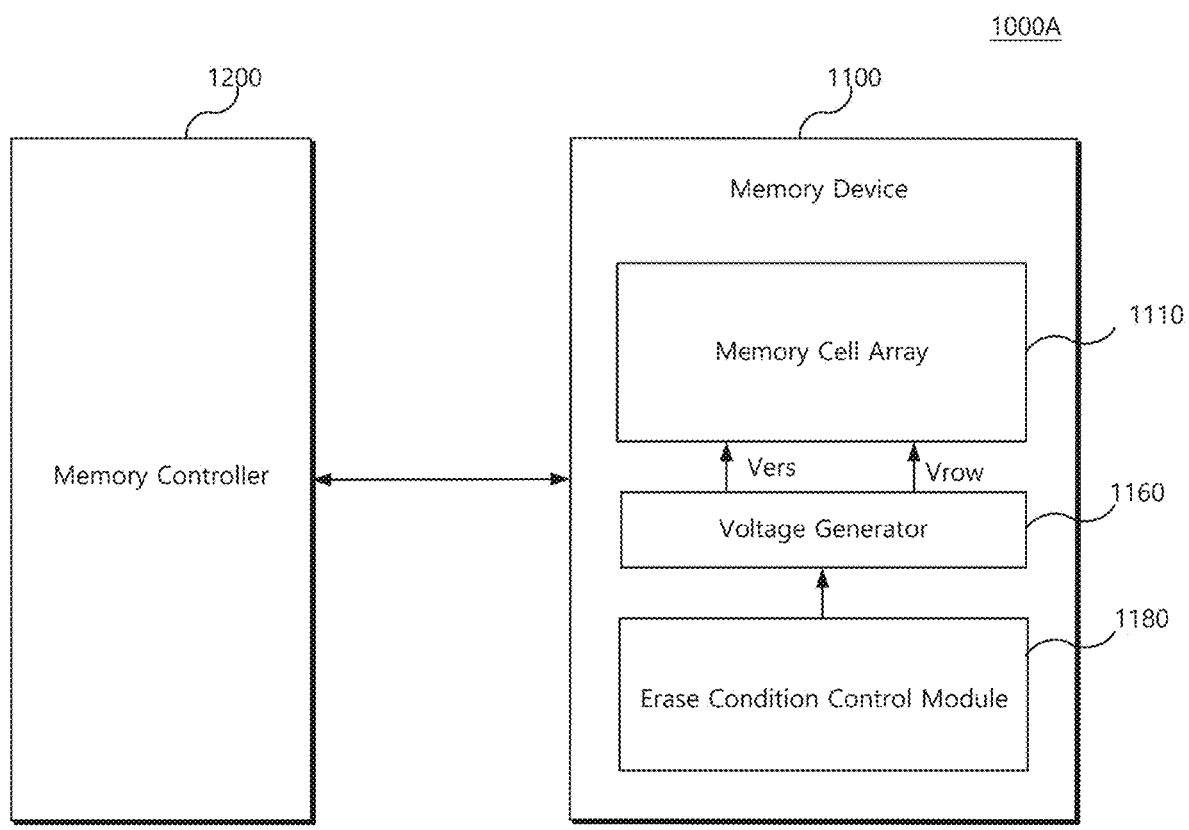
FIG. 1 is a block diagram illustrating a data storage device 1000A according to various example embodiments.

FIG. 1 is a block diagram illustrating a data storage device 1000A according to various example embodiments.

The data storage device 1000A according to various example embodiments may support a GIDL erase operation. In general, as the number of program/erase cycles (hereinafter referred to as "P/E cycles") increases, either or both of a memory cell or a selection transistor may be degraded. In this case, the channel gradient may be distorted in the GIDL erase operation. The distortion of the channel gradient may cause the generation of hot carriers (channel hot carriers or CHC, or hot carrier injection or HCI), and electrons generated by the hot carriers may be injected into a charge storage layer of a selection transistor, resulting in the reduction of on/off characteristic of the selection transistor. The data storage device 1000A according to various example embodiments may change an erase condition depending on the number of P/E cycles. Accordingly, the hot carriers may be prevented from or reduced in likelihood and/or impact from being generated due to the distortion of the channel gradient in the GIDL erase operation.

Referring to FIG. 1, the data storage device 1000A may include a memory device 1100 and a memory controller 1200, and the memory device 1100 may include a memory cell array 1110, a voltage generator 1160, and an erase condition control module circuit or erase condition control module 1180.

The memory device 1100 may receive an address signal, a command signal, and user data from the memory controller 1200. The memory device 1100 may store the user data, based on the address signal and the command signal. In some example embodiments, the memory device 1100 may perform an erase operation on data stored therein. In particular, the memory device 1100 according to various example embodiments may perform the GIDL erase operation in which an erase voltage Vers is applied through a common source line or a bit line.

The memory cell array 1110 may include a plurality of memory blocks that store data. For example, some or all of the plurality of memory blocks may store the user data. A part of the other memory blocks among the plurality of memory blocks may store the erase condition. For example, a memory block in which the erase condition is stored may be or may correspond to or include a one-time programmable (OTP) block and/or a secure block. The erase operation may be performed on a memory block in which the user data are stored and may be performed in units of block.

The voltage generator 1160 may generate the erase voltage Vers and row line voltages Vrow that may be used in the erase operation. For example, the erase voltage Vers may be provided to the common source line and/or the bit line in the GIDL erase operation. In the GIDL erase operation, the row line voltages Vrow may be provided to row lines such as a word line, a dummy word line, a ground selection line, a string selection line, and a GIDL line. The voltage generator 1160 may generate the erase voltage Vers and the row line voltages Vrow in a step-up manner, for example, so as to stepwise increase to a target voltage.

In the GIDL erase operation, the erase condition control module circuit or the erase condition control module 1180 may control the erase condition depending on the number of P/E cycles. For example, the erase condition may include a slope of the erase voltage Vers and/or a detect level. Herein, the slope of the erase voltage Vers may mean or may refer to a ramping slope along which the erase voltage Vers reaches a target voltage. The detect level may mean or may refer to a potential level of a channel at a time when a target row line among the row lines is floated.

The data storage device 1000A according to various example embodiments may prevent or reduce the likelihood of and/or impact from hot carriers being generated due to the distortion of the channel gradient by changing the erase condition depending on the number of P/E cycles.

Although FIG. 1 illustrates that the erase condition control module 1180 sends data and/or commands to the voltage generator 1160, and that the voltage generator 1160 sends data and/or commands and/or voltages to the memory cell array 1110, example embodiments are not limited thereto. For example, communication between the components may be one-way, or two-way, or multi-way.

Figure 2:
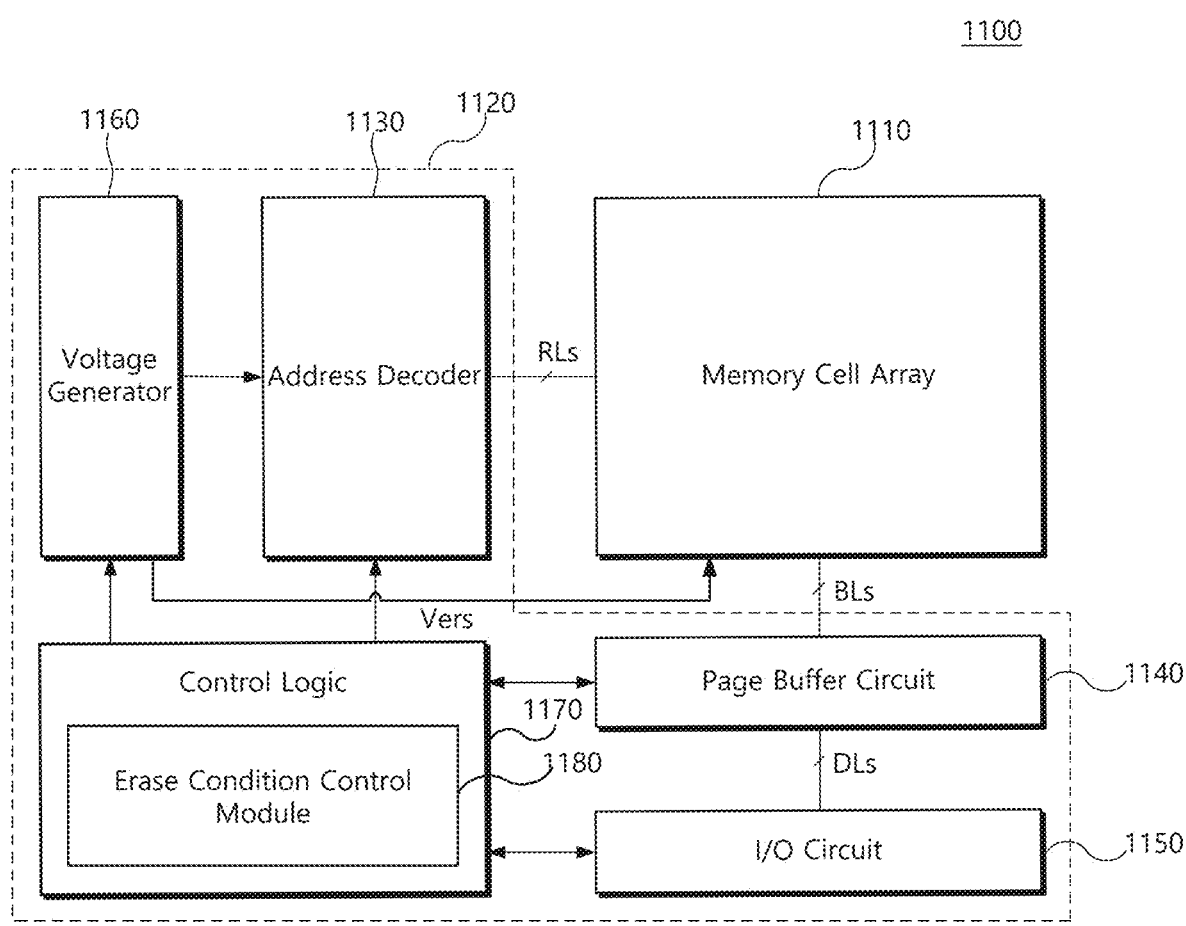
FIG. 2 is a block diagram illustrating an example of the memory device 1100 of FIG. 1.

FIG. 2 is a block diagram illustrating an example of the memory device 1100 of FIG. 1.

Referring to FIG. 2, the memory device 1100 includes the memory cell array 1110 and a peripheral circuit 1120, and the peripheral circuit 1120 includes an address decoder 1130, a page buffer circuit 1140, an input/output circuit 1150, the voltage generator 1160, and control logic 1170.

The memory cell array 1110 may include the plurality of memory blocks. Each of the memory blocks may have a two-dimensional structure and/or a three-dimensional structure. Memory cells of a memory block with the two-dimensional structure (or a horizontal (or planar) structure) may be formed in a direction parallel to a substrate. Memory cells of a memory block with the three-dimensional structure (or a vertical structure) may be formed in a direction perpendicular to the substrate.

The address decoder 1130 may be connected with the memory cell array 1110 through row lines RLs. The row lines RLs may include string selection lines SSLs, ground selection lines GSLs, word lines WLs, dummy word lines DWLs, and GIDL lines GIDLs.

In the erase operation, the address decoder 1130 may select a memory block targeted for the erase operation from among the plurality of memory blocks under control of the control logic 1170. Also, in the erase operation, the address decoder 1130 may float at least one of the row lines RLs under control of the control logic 1170.

The page buffer circuit 1140 may be connected with the memory cell array 1110 through bit lines BLs. The page buffer circuit 1140 may store, e.g. may temporarily store data to be programmed at a selected page and/or data read from the selected page.

The input/output circuit 1150 may be connected with the page buffer circuit 1140 through data lines DLs internally, and may be connected with the memory controller 1200 (refer to FIG. 1) through input/output lines externally.

The voltage generator 1160 may generate various voltages, e.g. voltages necessary or desired or expected or used, for the memory device 1100 to operate. For example, the voltage generator 1160 may be configured to generate various voltages, which are provided to the row lines RLs, the bit lines BLs, or a common source line CSL depending on the operation of the memory device 1100, such as one or more of a plurality of program voltages, a plurality of program verify voltages, a plurality of pass voltages, a plurality of read voltages, a plurality of read pass voltages, and a plurality of erase voltages Vers.

The control logic 1170 may control an overall operation of the memory device 1100 in response to a command and an address provided from the memory controller 1200. The control logic 1170 may include the erase condition control module 1180 that changes the erase condition in the GIDL erase operation.

The erase condition control module 1180 may control the voltage generator 1160 and the address decoder 1130 such that the erase condition changes, depending on the number of P/E cycles. For example, the erase condition control module 1180 may determine whether to change the erase condition such as an erase voltage slope and/or a detect level, based on the number of executed P/E cycles and/or on a variation of a threshold voltage according to the execution of the P/E cycle.

In various example embodiments, the erase condition control module 1180 may determine whether to change the erase condition, by comparing the number of executed P/E cycles with a given reference count. For example, when the number of executed P/E cycles is equal to the given reference count, the erase condition control module 1180 may control the voltage generator 1160 and/or the address decoder 1130 such that the erase condition is changed.

In various example embodiments, the erase condition control module 1180 may determine whether to change the erase condition, by comparing a threshold voltage of a transistor degraded according to the execution of the P/E cycle, with a reference voltage. For example, when the threshold voltage of the GIDL transistor and/or the selection transistor are greater than the reference voltage, the erase condition control module 1180 may control the voltage generator 1160 and/or the address decoder 1130 such that the erase condition is changed.

In various example embodiments, the erase condition control module 1180 may control the voltage generator 1160 such that the erase voltage slope is adjusted. For example, the erase condition control module 1180 may control the voltage generator 1160 such that the erase voltage slope becomes smaller as the number of P/E cycles increases. In this case, under control of the erase condition control module 1180, the voltage generator 1160 may increase a time (or a time period) necessary or used for the erase voltage Vers to stepwise increase to the target voltage level.

In various example embodiments, the erase condition control module 1180 may additionally or alternatively control the address decoder 1130 such that the detect level is adjusted. For example, the erase condition control module 1180 may control the address decoder 1130 such that the detect level of the dummy word line DWL gradually decreases as the number of P/E cycles increases. In this case, as the number of P/E cycles increases, the address decoder 1130 may gradually advance the timing to float the dummy word line DWL.

As described above, the memory device 1100 according to various example embodiments may prevent or reduce hot carriers from being generated due to the distortion of the channel gradient, by changing the erase condition (e.g., an erase voltage slope and/or a detection level) based on the number of executed P/E cycles, a variation of a threshold voltage according to the execution of the P/E cycle, etc.

Figure 3:
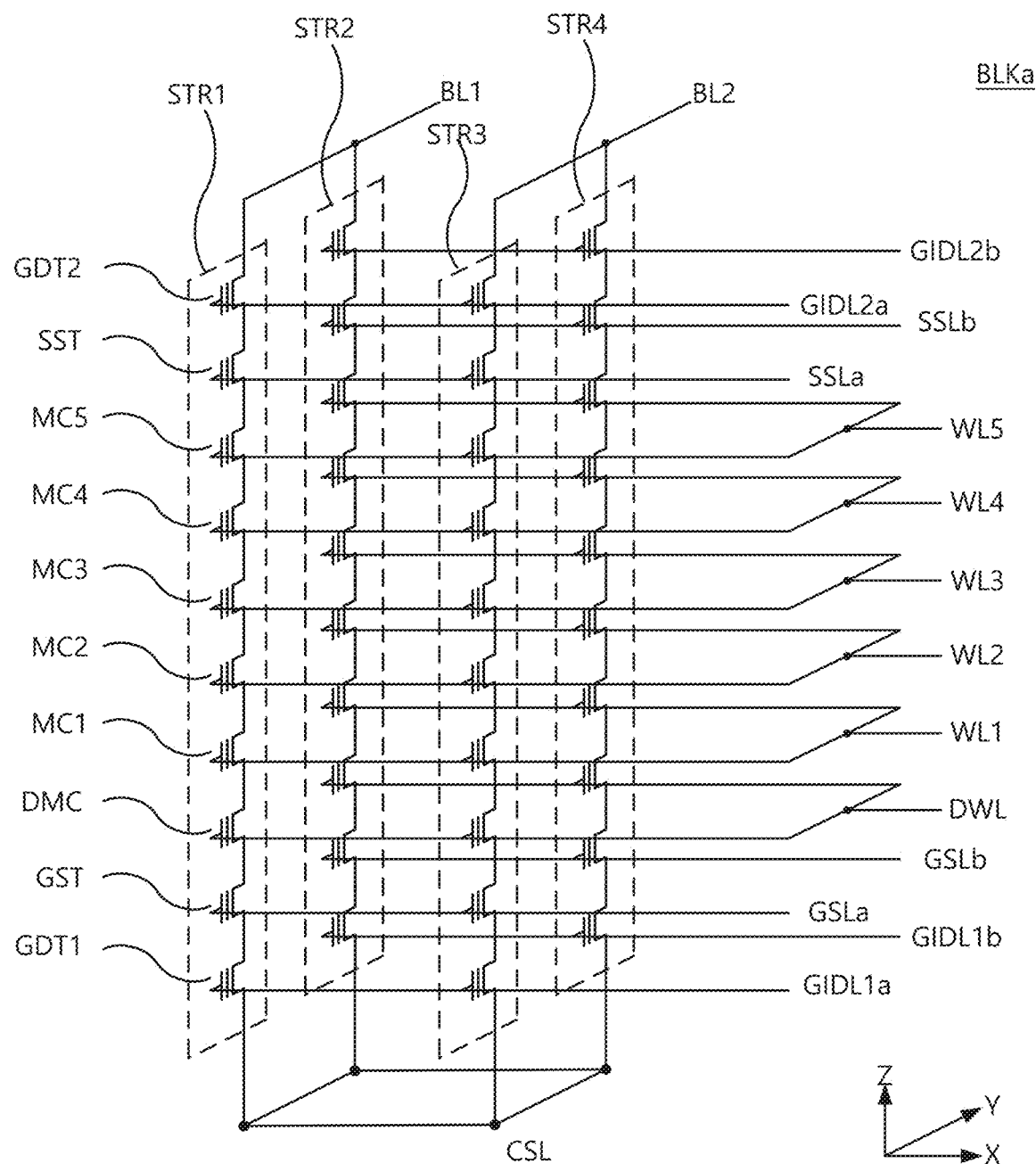
FIG. 3 is a circuit diagram illustrating one of a plurality of memory blocks included in the memory cell array 1100 of FIG. 2.

FIG. 3 is a circuit diagram illustrating one of a plurality of memory blocks included in the memory cell array 1110 of FIG. 2. For convenience of description, it is assumed that four strings STR1 to STR4 are included in one memory block; however, example embodiments are not limited thereto.

Referring to FIG. 3, a memory block BLKa may include a plurality of strings STR1 to STR4 vertically stacked on a substrate. The plurality of strings STR1 to STR4 may be disposed in a first direction (e.g., an X-axis direction) and a second direction (e.g., a Y-axis direction).

Strings belonging to the same column from among the plurality of strings STR1 to STR4 may be connected with the same bit line. For example, the first and second cell strings STR1 and STR2 may be connected with a first bit line BL1, and the third and fourth cell strings STR3 and STR4 may be connected with a second bit line BL2.

Each of the plurality of strings STR1 to STR4 may include a plurality of cell transistors. Each of the plurality of cell transistors may include a charge trap flash (CTF) memory cell, but example embodiments are not limited thereto. In some example embodiments, the memory block BLKa may include single-level cells (SLC), and/or double or multi-level cells (MLC), and/or triple-level cells (TLC); example embodiments are not limited thereto. The plurality of cell transistors may be stacked in a third direction (e.g., a Z-axis direction).

The plurality of strings STR1 to STR4 may be connected in common with the common source line CSL. For example, as illustrated in FIG. 3, the common source line CSL may be connected in common with lower ends of the plurality of strings STR1 to STR4. However, this is provided as an example. It may be sufficient if the common source line CSL is electrically connected with the lower ends of the strings STR1 to STR4, and example embodiments are not limited to the case that the common source line CSL is physically located at the lower ends of the strings STR1 to STR4. Below, for convenience of description, a structure and a configuration of a string will be described based on the first string STR1. The remaining strings STR2, STR3, and STR4 may be similar in structure to the first string STR1, and thus, additional description will be omitted to avoid redundancy.

The plurality of cell transistors may be connected in series between the first bit line BL1 and the common source line CSL. For example, the plurality of cell transistors may include GIDL transistors GDT1 and GDT2, a string selection transistor SST, memory cells MC1 to MC5, a dummy memory cell DMC, and ground selection transistors GST.

The GIDL transistors GDT1 and GDT2 may be disposed at a lower end and an upper end of the string STR1. For example, the first GIDL transistor GDT1 may be connected with the common source line CSL at the lower end of the string STR1. The second GIDL transistor GDT2 may be connected with the first bit line BL1 at the upper end of the string STR1. A gate of the first GIDL transistor GDT1 may be connected with a first GIDL line GIDL1a, and a gate of the second GIDL transistor GDT2 may be connected with a second GIDL line GIDL2a. However, this is provided as an example. According to various example embodiments, the GIDL transistor may be provided only at the upper end of the string STR1, or the GIDL transistor may be provided only at the lower end of the string STR1.

One string selection transistor SST may be provided between the fifth memory cell MC5 and the second GIDL transistor GDT2. A gate of the string selection transistor SST may be connected with a string selection line SSLa. However, this is provided as an example. According to various example embodiments, a plurality of string selection transistors that are connected in series may be provided between the fifth memory cell MC5 and the second GIDL transistor GDT2.

One ground selection transistor GST may be provided between the dummy memory cell DMC and the first GIDL transistor GDT1. A gate of the ground selection transistor GST may be connected with a ground selection line GSLa. However, this is provided as an example. According to various example embodiments, a plurality of ground selection transistors that are connected in series may be provided between the dummy memory cell DMC and the first GIDL transistor GDT1.

The first to fifth memory cells MC1 to MC5 may be connected in series between the string selection transistor SST and the dummy memory cell DMC. Gates of the first to fifth memory cells MC1 to MC5 may be respectively connected with first to fifth word lines WL1 to WL5.

One dummy memory cell DMC may be provided between the first memory cell MC1 and the first GIDL transistor GDT1. A gate of the dummy memory cell DMC may be connected with a dummy word line DWL. However, this is provided as an example. According to various example embodiments, a plurality of dummy memory cells that are connected in series may be provided between the first memory cell MC1 and the first GIDL transistor GDT1. Alternatively, an additional dummy memory cell may be provided between the string selection transistor SST and the fifth memory cell MC5.

In some example embodiments, each of the dummy memory cells DMC and/or each of the dummy word lines DWL may not actively store data, and/or may not be electrically available to store memory. In some example embodiments, each of the dummy memory cells DMC and/or each of the dummy word lines DWL may provide support, e.g. electrical and/or mechanical and/or fabrication support; example embodiments are not limited thereto. In some example embodiments, each of the dummy memory cells DMC and/or each of the dummy word lines DWL may be electrically active, but may or may not store data.

In the GIDL erase operation, the first GIDL transistor GDT1 and the second GIDL transistor GDT2 may operate as a transistor for hole generation. For example, when the erase voltage is provided through the first bit line BL1 and the GIDL voltage is provided through the second GIDL line GIDL2a, a high electric field may be formed at a channel region adjacent to the second GIDL transistor GDT2 by a potential difference between the erase voltage and the GIDL voltage. Holes may be generated at the channel region adjacent to the second GIDL transistor GDT2 by the high electric field. Likewise, when the erase voltage is provided through the common source line CSL and the GIDL voltage is provided through the first GIDL line GIDL1a, a high electric field may be formed at a channel region adjacent to the first GIDL transistor GDT1 by a potential difference between the erase voltage and the GIDL voltage.

In various example embodiments, in the GIDL erase operation, only either the holes generated at the channel region adjacent to the first GIDL transistor GDT1 or the holes generated in the channel region adjacent to the second GIDL transistor GDT2, but not both sets of holes, may be injected into the channel of the first string STR1. For example, only the holes generated at the channel region adjacent to the first GIDL transistor GDT1 may be injected into the channel of the first string STR1, and the holes generated in the channel region adjacent to the second GIDL transistor GDT2 may be prevented from or reduced in likelihood of being injected into the channel of the first string STR1.

In this case, a relatively great potential difference may be instantaneously formed in between the channel region at the lower end of the first string STR1. In particular, as the number of executed P/E cycles increases, a greater potential difference may occur to such an extent that hot carriers are generated in-between the channel region at the lower end of the first string STR1. To prevent or reduce the generation of the hot carriers, the data storage device 1000A according to various example embodiments may change the erase condition depending on the number of P/E cycles. As the generation of the hot carriers is prevented or reduced, the on/off characteristic of the selection transistor may be improved; for example, a lifetime and/or a total number of P/E cycles may be increased, without or with a reduced amount of loss of a read window.

Figure 4:
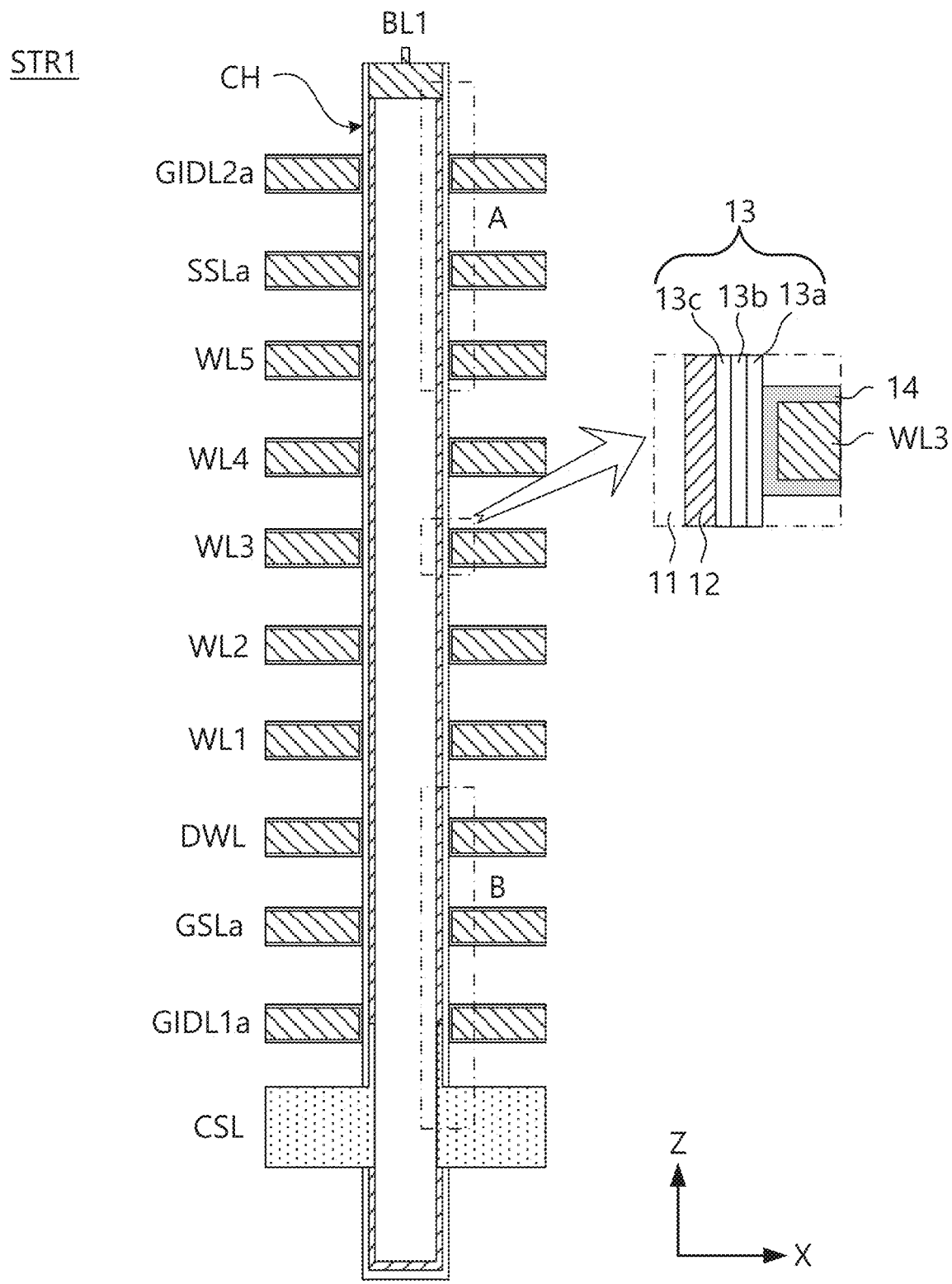
FIG. 4 is a vertical cross-sectional view illustrating the first string STR1 among the strings STR1 to STR4 of FIG. 3.

FIG. 4 is a vertical cross-sectional view illustrating, e.g., the first string STR1 among the strings STR1 to STR4 of FIG. 3.

Referring to FIG. 4, the first string STR1 may include a channel structure CH, and a plurality of row lines may be sequentially stacked to be adjacent to the channel structure CH.

The channel structure CH may include a vertical channel layer 12, a buried insulating layer 11 filling an inner space of the vertical channel layer 12, and a vertical insulating layer 13 disposed between the vertical channel layer 12 and the row lines. According to various example embodiments, the channel structure CH may have an inclined side surface, and thus, a diameter of the channel structure CH may narrow as it goes toward the substrate and the channel structure CH may taper. Alternatively, according to various example embodiments, the channel structure CH may have an inclined side surface, and thus, the diameter of the channel structure CH may become larger as it goes toward the substrate. Alternatively, according to various example embodiments, the first string STR1 may include two or more channel structures CHs stacked in the vertical direction.

The vertical channel layer 12 may include a semiconductor material such as polysilicon or single crystal silicon. In some example embodiments, the semiconductor material may be a material that is not doped with impurities (or dopants). According to various example embodiments, the vertical channel layer 12 may be in the shape of a pillar, in which the buried insulating layer 11 does not exist, such as a cylinder or a prism. The vertical insulating layer 13 may include a blocking film 13a, a charge storage film 13b, and a tunnel insulating film 13c.

The blocking film 13a may be interposed between the charge storage film 13b and the row lines. At least a portion of the blocking film 13a may be formed to surround the row lines so as to be provided as a blocking layer 14. The blocking film 13a may include a material whose energy band gap is greater than that of the charge storage film 13b. For example, the blocking film 13a may include one or more of a silicon oxide film, a silicon nitride film, and/or a silicon oxide nitride film.

The charge storage film 13b may be interposed between the blocking film 13a and the tunnel insulating film 13c. For example, the charge storage film 13b may include at least one of a silicon nitride film, a silicon oxynitride film, a silicon-rich nitride film, or a nanocrystalline silicon and/or laminated trap film.

The tunnel insulating film 13c may be interposed between the charge storage film 13b and the vertical channel layer 12. The tunnel insulating film 13c may include a material whose band gap is greater than that of the charge storage film 13b. For example, the tunnel insulating film 13c may include a silicon oxide film.

The plurality of row lines may be sequentially stacked on the common source line CSL. The plurality of row lines may include, for example, the first GIDL line GIDL1a, the ground selection line GSLa, the dummy word line DWL, the first to fifth word lines WL1 to WL5, the string selection line SSLa, and the second GIDL line GIDL2a. The plurality of row lines may include, for example, a metal such as doped or undoped polysilicon and/or tungsten (W) and/or conductive metal nitride.

The first bit line BL1 may be disposed at the upper end of the string STR1. In the erase operation, the erase voltage may be provided to the first string STR1 through the first bit line BL1. The common source line CSL may be disposed at the lower end of the first string STR1. For example, the common source line CSL may be an impurity region formed in the substrate and/or formed on the substrate. In the erase operation, the erase voltage may be provided to the first string STR1 through the common source line CSL. However, this is provided as an example. As described with reference to FIG. 3, in the erase operation, the erase voltage may be provided only through one of the first bit line BL1 or the common source line CSL.

Figure 5:
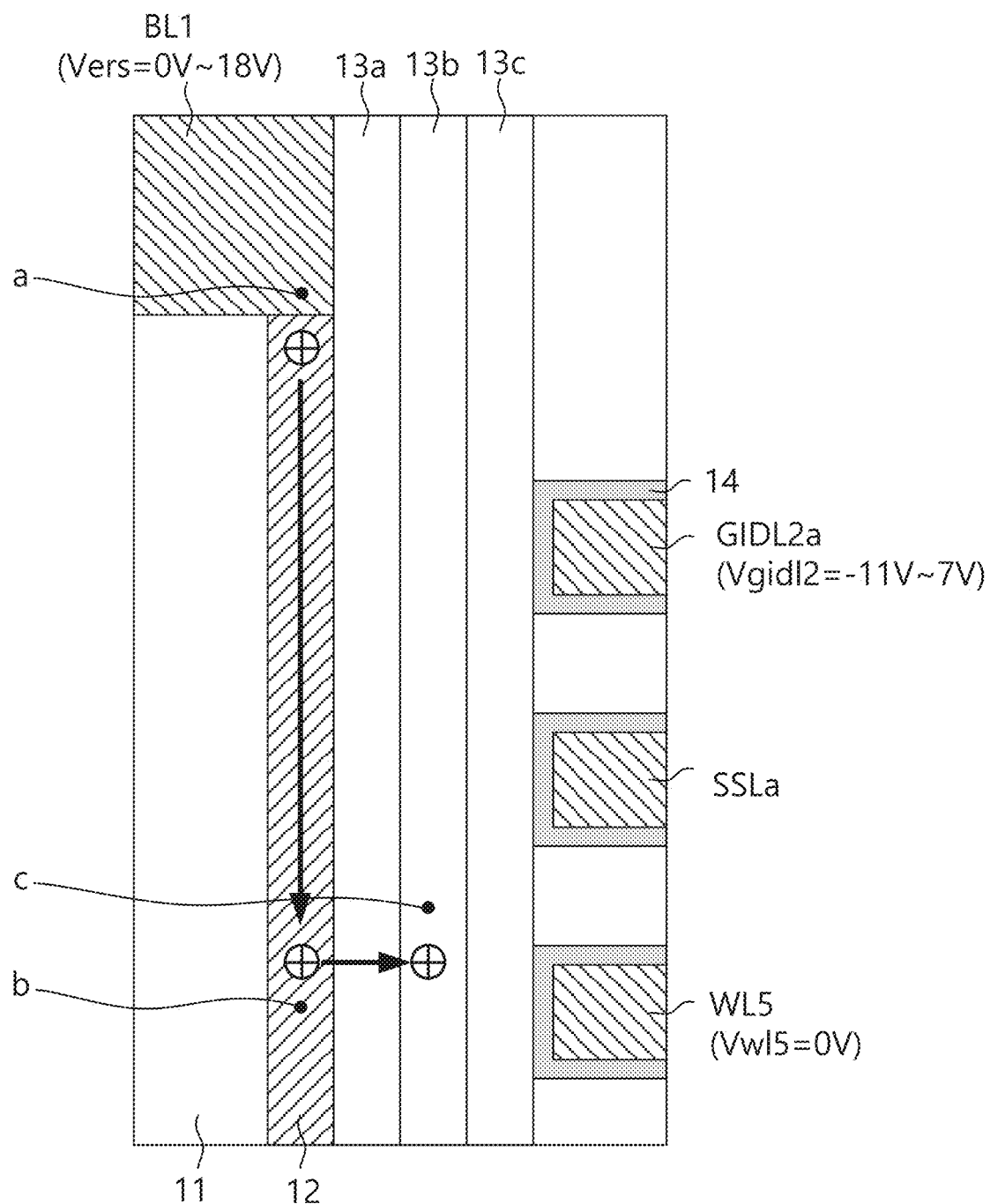
FIG. 5 is an enlarged cross-sectional view illustrating region "A" of FIG. 4.
Figure 6:
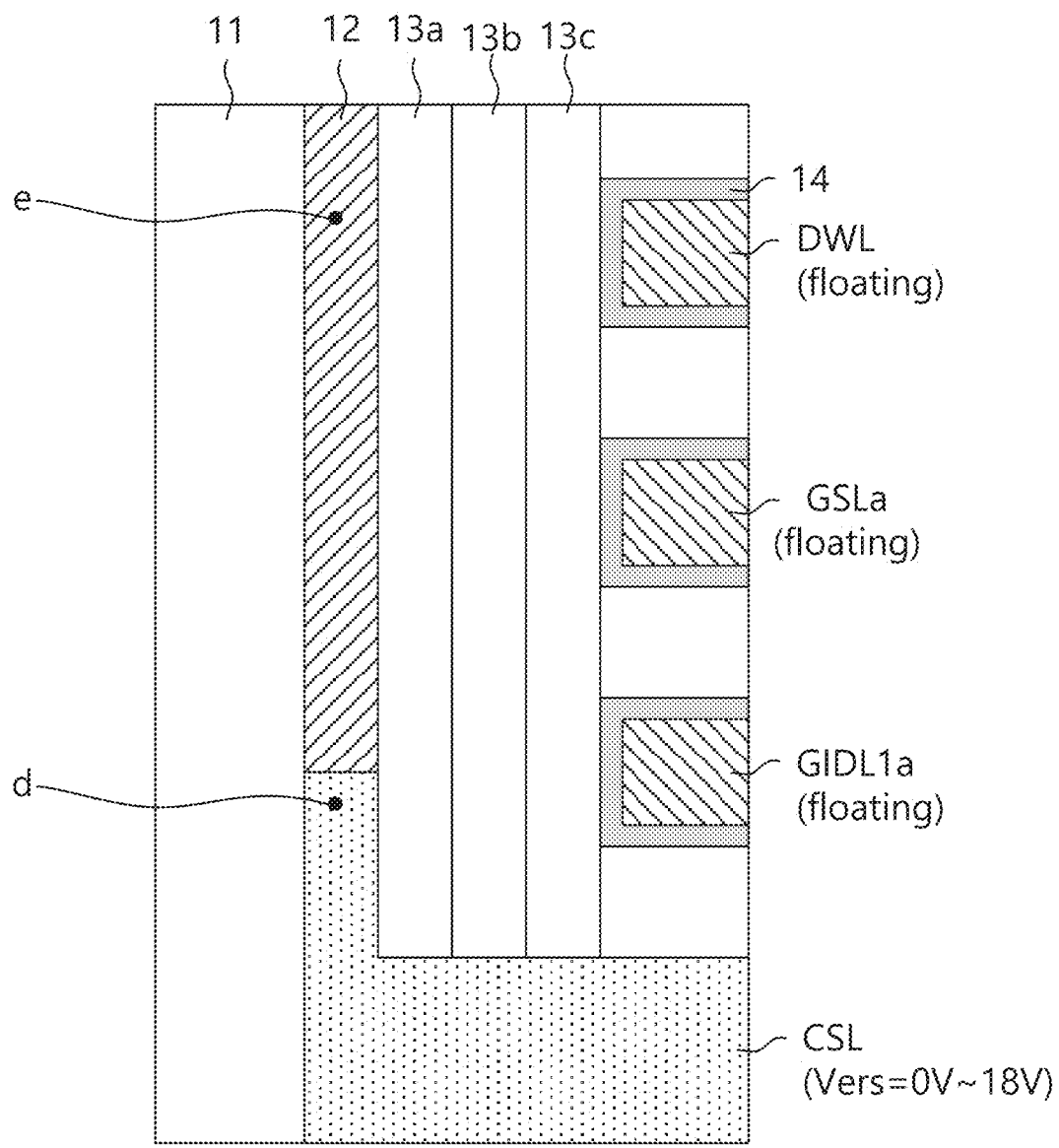
FIG. 6 is an enlarged cross-sectional view illustrating region "B" of FIG. 4.

FIG. 5 is an enlarged cross-sectional view illustrating region "A" of FIG. 4, and FIG. 6 is an enlarged cross-sectional view illustrating region "B" of FIG. 4. For convenience of description, it is assumed that the erase voltage Vers is provided to the first bit line BL1 and the common source line CSL in the GIDL erase operation. Also, it is assumed that only holes formed in the channel region at the upper end of the first string STR1 are injected into the channel and holes formed in the channel region at the lower end of the first string STR1 are prevented or reduced from being injected into the channel.

Referring to FIG. 5, during the GIDL erase operation, the erase voltage Vers may be applied to the first bit line BL1. For example, a target voltage level of the erase voltage Vers may be 18V. Also, during the erase operation, a second GIDL voltage Vgidl2 may be applied to the second GIDL line GIDL2a. For example, the second GIDL voltage Vgidl2 may be applied while maintaining a given potential difference with the erase voltage Vers. Also, during the erase operation, a word line voltage Vwl5 may be applied to the fifth word line WL5. For example, the word line voltage Vwl5 may be 0 V.

The erase voltage Vers may stepwise increase (or step up) to the target voltage level. A period in which the erase voltage Vers stepwise increases to the target voltage level may be referred to as a "step-up period". During the step-up period, the second GIDL voltage Vgidl2 may stepwise increase while maintaining the given potential difference with the erase voltage Vers.

In this case, a magnitude and/or a pulse width of a unit step voltage of the erase voltage Vers may be respectively identical to a magnitude and/or a pulse width of a unit step voltage of the second GIDL voltage Vgidl2. For example, when the erase voltage Vers stepwise increases from 0 V to 18 V, the second GIDL voltage Vgidl2 may stepwise increase from −11 V to 7 V. Accordingly, during the erase operation, the second GIDL voltage Vgidl2 may maintain the given potential difference (e.g., 11 V) with the erase voltage Vers. Because the second GIDL voltage Vgidl2 and the erase voltage Vers stepwise increase while maintaining the given potential difference (e.g., 11 V), a first potential difference (e.g., 11 V) may exist between the second GIDL line GIDL2a and the first bit line BL1. When the first potential difference exists between the second GIDL line GIDL2a and the first bit line BL1, the band-to-band tunneling effect may occur at a junction region "a" of the vertical channel layer 12 and the first bit line BL1.

According to the band-to-band tunneling effect, an electron of the vertical channel layer 12 may be transported to the junction region "a", and a hole (+) may be generated at a place where the electron was. An isolated region may occur in a portion of the vertical channel layer 12, which is adjacent to the second GIDL line GIDL2a. The hole (+) may be accumulated in the isolated region. As the first potential difference between the second GIDL line GIDL2a and the first bit line BL1 becomes greater, the absolute or total amount of holes (+) accumulated in the isolated region may increase.

During the step-up period, the fifth word line voltage Vwl5 may be applied to the fifth word line WL5. The fifth word line voltage Vwl5 may be, for example, 0 V. The string selection transistor SST may be in a turn-off state; in this case, the vertical channel layer 12 may be in a floating state. According to the above condition, the fifth word line voltage Vwl5 may be coupled to the vertical channel layer 12, with the insulating layers 13a to 13c interposed therebetween. Through the coupling, the same voltage (e.g., 0 V) as the fifth word line voltage Vwl5 may be applied to a vertical channel layer "b" adjacent to the fifth word line WL5. Accordingly, a second potential difference (e.g., 0 V to 18 V) may occur between the junction region "a" and the vertical channel layer "b" adjacent to the fifth word line WL5.

When the second potential difference occurs between the junction region "a" and the vertical channel layer "b" adjacent to the fifth word line WL5, the holes (+) accumulated in the isolated region may move toward or be attracted toward the fifth word line WL5 along the vertical channel layer 12. As the second potential difference between the junction region "a" and the vertical channel layer "b" adjacent to the fifth word line WL5 becomes greater, the holes (+) may move more rapidly toward the fifth word line WL5 from the isolated region.

After the step-up period, the erase voltage Vers may maintain the target voltage level. A period in which the erase voltage Vers maintains the target voltage level may be referred to as an "execution period". During the execution period, the holes (+) of the vertical channel layer "b" adjacent to the fifth word line WL5 may move to the charge storage film 13b adjacent to the fifth word line WL5. During the execution period, a third potential difference may occur between the vertical channel layer "b" adjacent to the fifth word line WL5 and the charge storage film 13b. As the third potential difference becomes greater, the absolute amount of holes (+) moving to the charge storage film 13b may increase.

As described with reference to FIG. 5, the holes (+) generated at the upper end of the first string STR1 may be injected into the vertical channel layer 12 during the step-up period of the erase operation, and the holes (+) of the vertical channel layer 12 may move to the charge storage film 13b during the execution period of the erase operation. As such, data stored in the memory cell may be erased.

Referring to FIG. 6, in the GIDL erase operation, the erase voltage Vers may be provided to the common source line CSL. During the step-up period, the first GIDL line GIDL1a, the ground selection line GSLa, and the dummy word line DWL may each be floated. Accordingly, holes (+) may not be generated at the lower end of the first string STR1, or only the small amount or number of holes may be generated at the lower end thereof. Also, because the dummy word line DWL is in the floating state during the step-up period, a potential difference may not occur between a junction region "d" of the common source line CSL and the vertical channel layer 12 and a vertical channel layer "e" adjacent to the dummy word line DWL, or a small potential difference may occur therebetween. Accordingly, the injection of the holes (+) of the junction region "d" into the vertical channel layer 12 may be blocked.

As described with reference to FIG. 6, the injection of the holes (+) into the vertical channel layer 12 at the lower end of the first string STR1 may be blocked or at least partly blocked during the erase operation.

Figure 7:
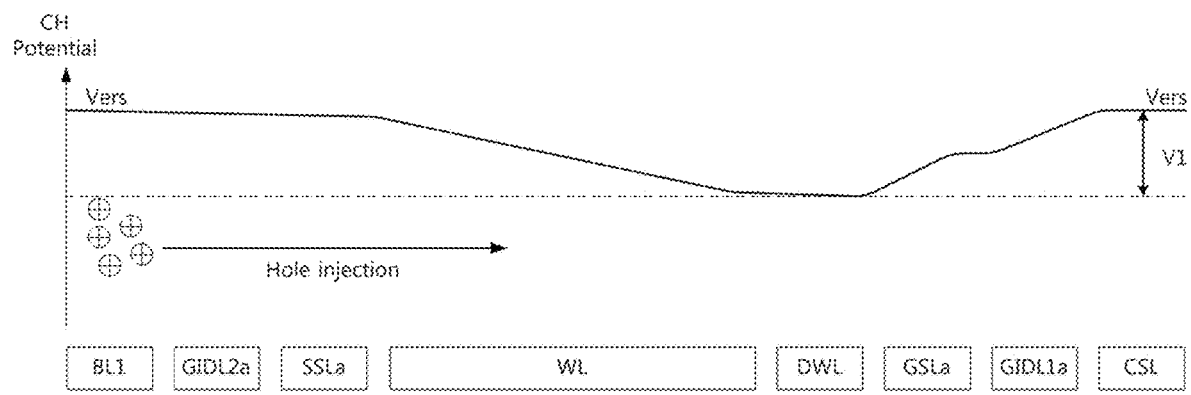
FIG. 7 is a diagram illustrating an example of a channel potential gradient formed in a GIDL erase operation.

FIG. 7 is a diagram illustrating an example of a channel potential gradient formed in a GIDL erase operation. For convenience of description, like FIGS. 5 and 6, it is assumed that the holes (+) generated at the upper end of the string are injected into the vertical channel layer and the holes (+) generated at the lower end of the string are prevented from or reduced from being injected into the vertical channel layer.

When the erase voltage Vers is provided to the first bit line BL1 and the common source line CSL during the erase operation, the channel region adjacent to the first bit line BL1 and the channel region adjacent to the common source line CSL may have a high potential level as illustrated in FIG. 7. Also, when the holes (+) generated at the upper end of the string are injected in the direction from the second GIDL line GIDL2a to the first GIDL line GIDL1a, the channel potential of the vertical channel layer may be high around the second GIDL line GIDL2a and may be low around the ground selection line GSLa.

In detail, holes generated at the side of the first bit line BL1 may be injected into the vertical channel layer. The first GIDL line GIDL1a may be floated immediately when the erase voltage starts to increase; in this case, because holes are not generated at the side of the first GIDL line GIDL1a, a voltage of a relevant word line may increase. A given time is taken for the holes injected from the side of the first bit line BL1 to be injected into the entire vertical channel layer. Accordingly, a potential difference may occur at a channel between the first GIDL line GIDL1a and the ground selection line GSLa on the left side thereof. In this case, a first potential difference V1 may be formed on a channel potential of the vertical channel layer. The first potential difference V1 may be a potential difference insufficient to generate hot carriers, and thus, the GIDL erase operation may be performed without the generation of the hot carriers.

Figure 8:
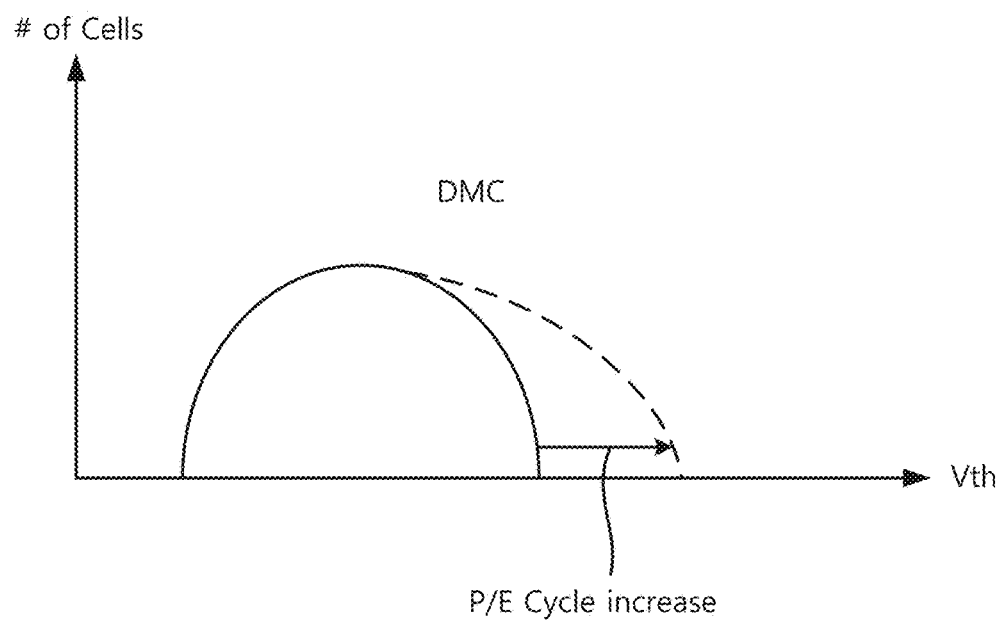
FIG. 8 is a diagram illustrating an example of a change in a threshold voltage of the dummy memory cell DMC according to an increase in the number of executed P/E cycles.
Figure 9:
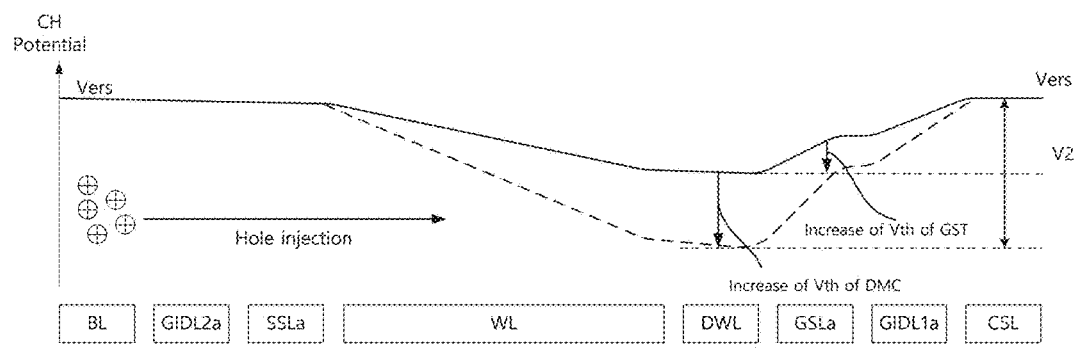
FIG. 9 is a diagram illustrating an example of a channel potential gradient distorted due to an increase in the number of executed P/E cycles.

FIG. 8 is a diagram illustrating an example of a change in a threshold voltage of a dummy memory cell DMC according to an increase in the number of executed P/E cycles. FIG. 9 is a diagram illustrating an example of a channel potential gradient distorted due to an increase in the number of executed P/E cycles.

Referring to FIG. 8, as the number of executed P/E cycles increases, the threshold voltage or the threshold voltage range of the dummy memory cell DMC may undesirably increase. For example, as the number of P/E cycles increases, electrons undesirably trapped in the charge storage layer of the dummy memory cell DMC may increase in amount, resulting in an increase in the threshold voltage of the dummy memory cell DMC.

Referring to FIG. 9, as the threshold voltage of the dummy memory cell DMC undesirably increases, the channel potential gradient of the string may be distorted.

In detail, as the threshold voltage of the dummy memory cell DMC increases, a potential of a channel region adjacent to the dummy memory cell DMC may become lower. In this case, because the erase voltage Vers is applied to the common source line CSL, a potential difference of the channel potential of the vertical channel layer gradually increases as it goes toward the dummy word line DWL.

For example, as illustrated in FIG. 9, when the number of executed P/E cycles is a particular, e.g. a given count or more, the channel potential of the vertical channel layer may have a second potential difference V2 sufficient to generate the hot carriers. As such, the hot carriers may be generated at the lower end of the string, and electrons generated by the hot carriers may be injected into the charge storage layer of the ground selection transistor GST, which causes a change in the threshold voltage of the ground selection transistor GST. This may mean or indicate that the on/off characteristic of the ground selection transistor GST is reduced.

The data storage device 1000A according to various example embodiments may prevent or reduce the generation of hot carriers due to the channel distortion by changing the erase condition based on the number of P/E cycles. As such, the on/off characteristic of the ground selection transistor GST may be improved, and/or the reliability and/or lifetime of the data storage device 1000A may be improved.

Below, various modification examples and various application examples of a data storage device according to various example embodiments will be described in detail. For convenience of description, it will be assumed that data storage devices to be described below have the same configuration as the first string STR1 described with reference to FIGS. 3 to 5. Also, it will be assumed that the erase voltage Vers is provided to the first bit line BL1 and the common source line CSL in the GIDL erase operation but only holes generated at the upper end of the first string STR1 are injected into the channel.

[Data Storage Device Changing Erase Condition Based on Number Such as a Pre-Determined Number of P/E Cycles]

Figure 10:
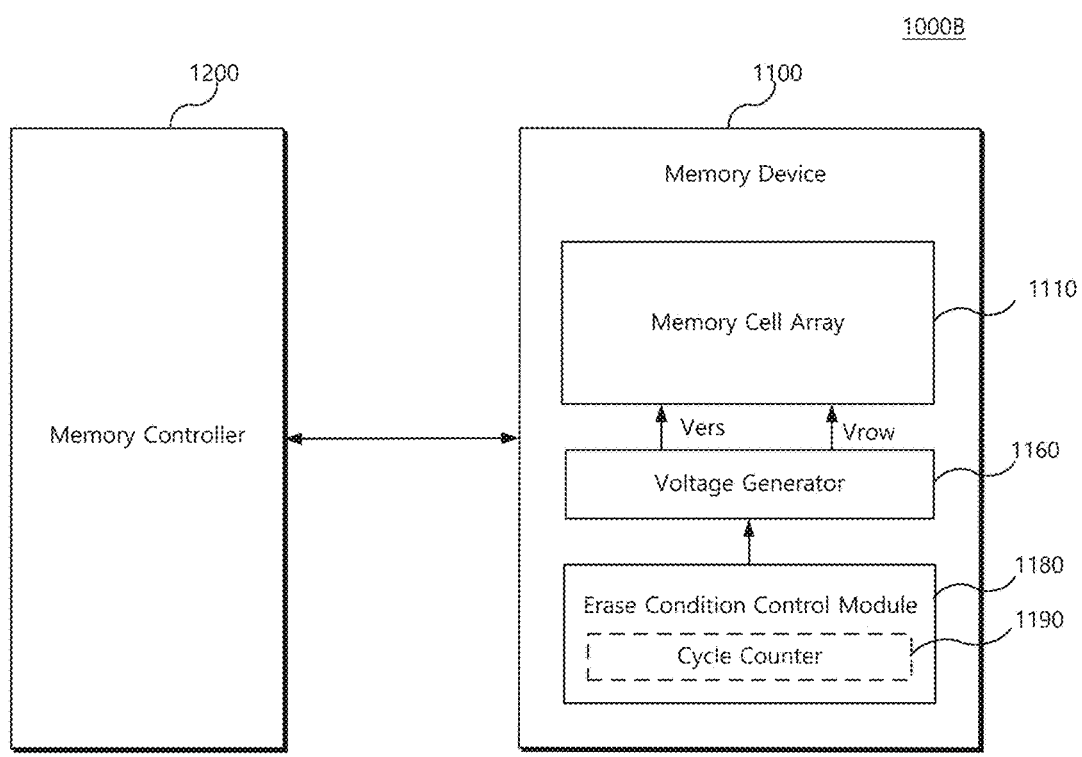
FIG. 10 is a block diagram illustrating a data storage device 1000B according to various example embodiments.

FIG. 10 is a block diagram illustrating a data storage device 1000B according to various example embodiments. A configuration and an operation of the data storage device 1000B of FIG. 10 are similar to those of the data storage device 1000A of FIG. 1. Accordingly, the same or similar components may be marked by the same or similar reference numerals/signs, and additional description associated with the same or similar components will be omitted to repeated redundancy.

The data storage device 1000B of FIG. 10 may determine whether to change the erase condition based on a number, such as a dynamically determined (or, alternatively, a pre-determined number) of P/E cycles. To this end, compared to the data storage device 1000A of FIG. 1, the data storage device 1000B of FIG. 10 may further include a cycle counter 1190.

The cycle counter 1190 may count P/E cycles of memory blocks included in the memory cell array 1110 (refer to FIG. 2) and may store counting results.

The erase condition control module 1180 may receive information about the number of executed P/E cycles from the cycle counter 1190. The erase condition control module 1180 may change the erase condition based on the number of executed P/E cycles.

For example, when the number of executed P/E cycles is a reference count or more, the erase condition control module 1180 may change the slope of the erase voltage. Herein, the reference count may refer to the above number of P/E cycles. This will be described in detail with reference to FIG. 11 to FIG. 15 below. As another example, when the number of executed P/E cycles is the reference count or more, the erase condition control module 1180 may change the detect level. This will be described in detail with reference to FIG. 16 to FIG. 24 below. Meanwhile, an example in which the cycle counter 1190 is included in the erase condition control module 1180 is illustrated in FIG. 10. However, this is provided as an example, and each of the erase condition control module 1180 and the cycle counter 1190 may be implemented with an independent hardware or software module.

[Data Storage Device Adjusting Slope of Erase Voltage]

Figure 11:
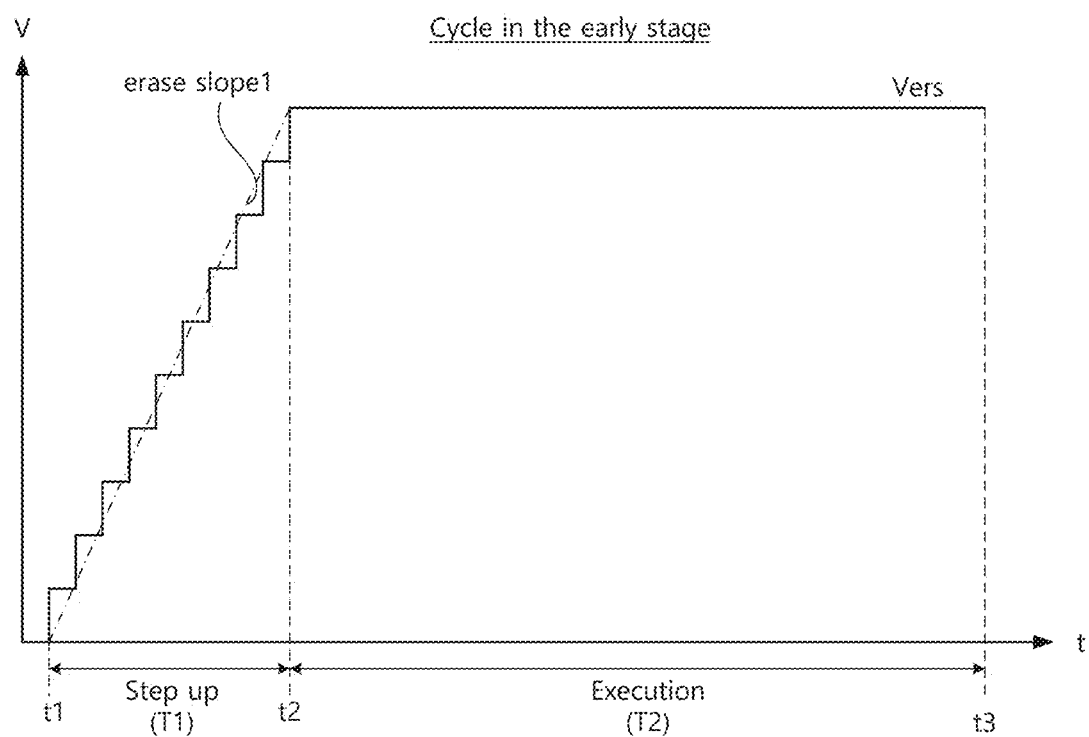
FIGS. 11 and 12 are diagrams for describing various example embodiments in which a slope of an erase voltage is changed based on the number of executed P/E cycles.
Figure 12:
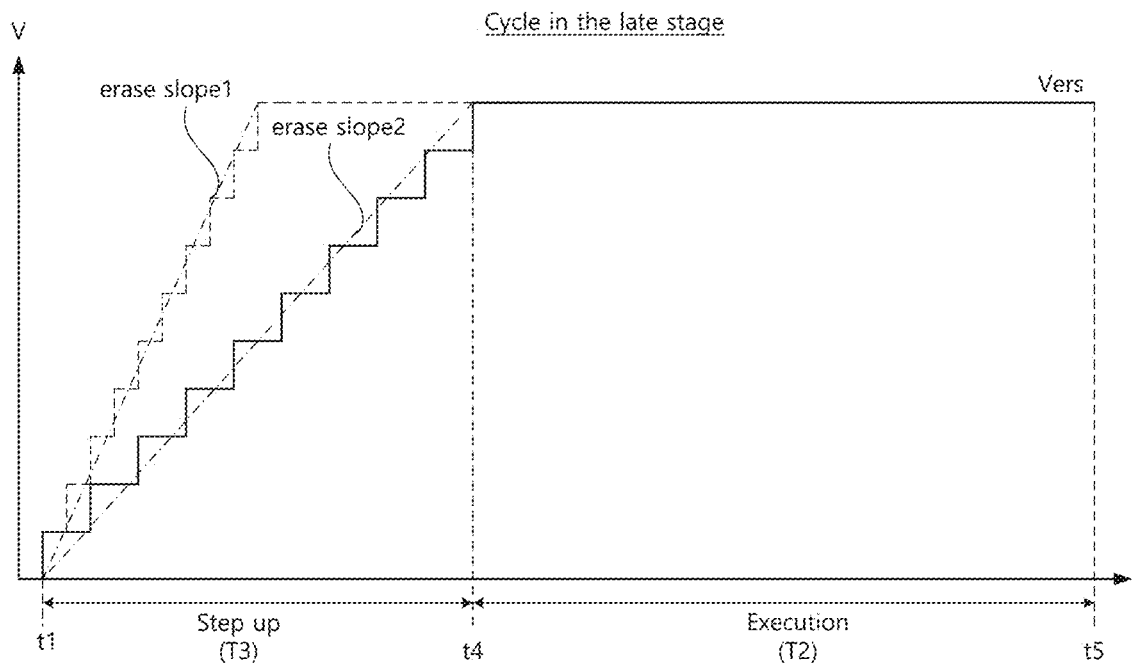
Figure 13:
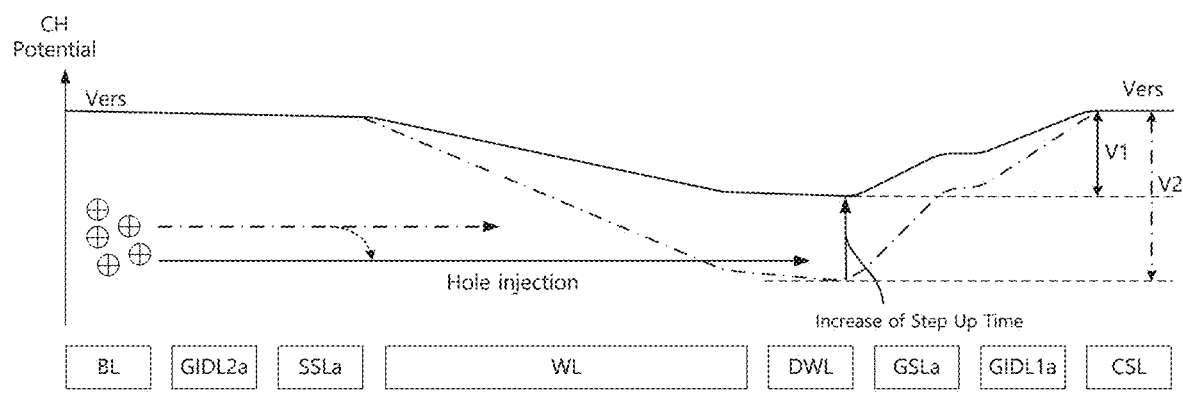
FIG. 13 is a diagram illustrating an example of a channel potential gradient improved by adjusting a slope of an erase voltage based on the number of executed P/E cycles.

FIGS. 11 and 12 are diagrams for describing various example embodiments in which a slope of an erase voltage is changed based on the number of executed P/E cycles. FIG. 13 is a diagram illustrating an example of a channel potential gradient improved by adjusting a slope of an erase voltage based on the number of executed P/E cycles.

An example of the erase voltage Vers that is generated by the voltage generator 1160 (refer to FIG. 10) when the number of executed P/E cycles is the reference count or less is illustrated in FIG. 11. A total erase time may include a step-up period T1 and an execution period T2. During the step-up period T1, the erase voltage Vers may stepwise increase until reaching the target voltage level. During the execution period T2, the erase voltage Vers may maintain the target voltage level.

When the number of executed P/E cycles is the reference count or less, a threshold voltage of a dummy memory cell may not increase, or an increment in the threshold voltage of the dummy memory cell is small. Accordingly, the distortion of the channel gradient of the vertical channel layer in the string may not occur; alternatively, even though the distortion occurs, the degree of distortion is not great to such an extent that hot carriers are generated or a significant number of hot carriers are generated.

Accordingly, when the number of executed P/E cycles is the reference count or less, the voltage generator 1160 according to various example embodiments may set the step-up period T1 to be short, e.g. as short as possible. For example, the voltage generator 1160 may stepwise increase the erase voltage Vers to the target voltage level as fast as possible. As such, when the number of executed P/E cycles is the reference count or less, the erase operation may be performed more quickly.

An example of the erase voltage Vers that is generated by the voltage generator 1160 when the number of executed P/E cycles is the reference count or more is illustrated in FIG. 12.

As described above, when the number of executed P/E cycles is the reference count or more, the threshold voltage of the dummy memory cell may increase, which may cause the distortion of the channel gradient. To improve the distortion of the channel gradient, the voltage generator 1160 according to various example embodiments may set a step-up period T3 to be long, as illustrated in FIG. 12. For example, the voltage generator 1160 may change the slope of the erase voltage Vers from a first ramping slope (ramping slope1) to a second ramping slope (ramping slope2). In this case the execution period T2 may be identically maintained.

As the slope of the erase voltage is changed to be small, the erase voltage Vers may slowly increase to the target voltage level.

For example, when the step-up period T3 is set to be long, the holes (+) generated at the upper end of the string may be sufficiently injected (hot carrier injection) up to the lower end of the vertical channel layer. For example, as illustrated in FIG. 13, as the step-up period T3 is set to be long, a sufficient time may be secured to such an extent that the holes (+) generated at the upper end of the string are injected up to the lower end of the vertical insulating layer. Accordingly, a potential of the channel region located at the lower end of the string increases before the erase voltage of the first GIDL line GIDL1a increases to a high level. This may mean or indicate that the channel potential difference decreases. Alternatively or additionally, even though the erase voltage reaches the target level, the channel potential difference thus decreased may be maintained. As a result, as illustrated in FIG. 13, the distortion of the channel gradient may be improved, and thus, the generation of hot carriers may be prevented or reduced in likelihood of occurrence.

As described with reference to FIGS. 11 to 13, when the number of executed P/E cycles is the reference count or less, the data storage device 1000B according to various example embodiments may set the slope of the erase voltage to be great such that the erase operation is quickly performed;

when the number of executed P/E cycles is the reference count or more, the data storage device 1000B may set the slope of the erase voltage to be small such that the distortion of the channel gradient is improved.

Meanwhile, an example in which the slope of the erase voltage is changed once is described with reference to FIGS. 11 to 13. However, this is provided as an example, and example embodiments are not limited thereto. For example, the slope of the erase voltage may be adjusted (or changed or controlled) a plurality of times. This will be described in detail with reference to FIG. 14 below.

Figure 14:
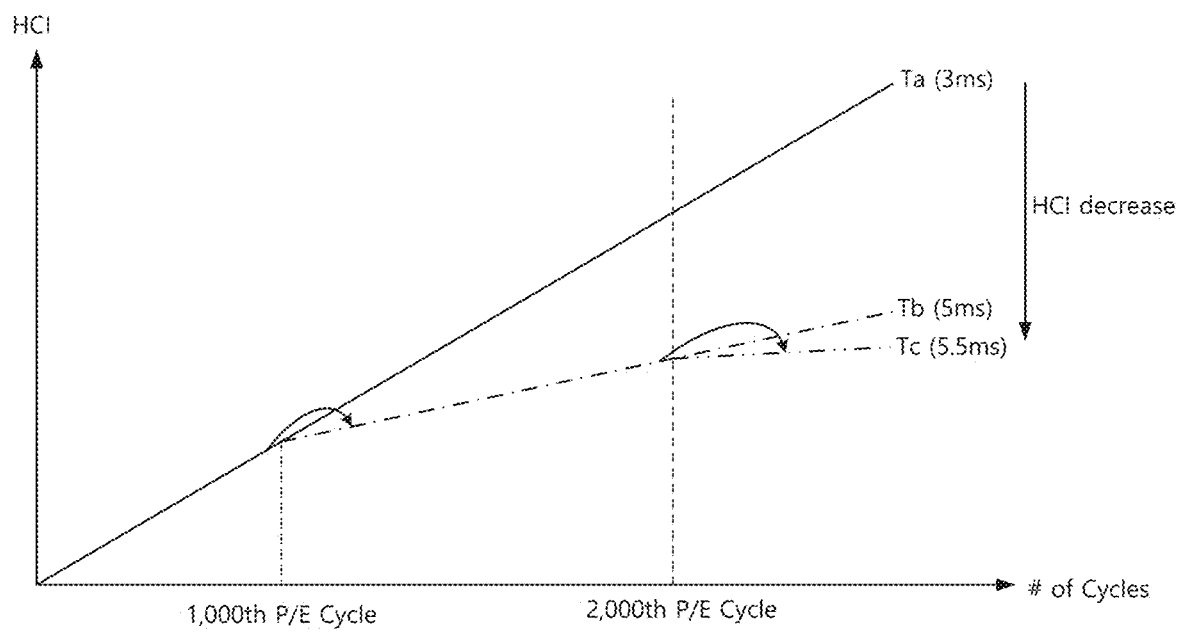
FIG. 14 is a diagram illustrating an example in which a slope of an erase voltage is adjusted plural times, according to various example embodiments.

FIG. 14 is a diagram illustrating an example in which a slope of an erase voltage is adjusted a plurality of times, according to various example embodiments. For convenience of description, it is assumed that the slope of the erase voltage is changed for the first time at a $1000^{th}$ P/E cycle and is then again changed at a $2000^{th}$ P/E cycle; however, example embodiments are not limited to these numbers. For example, the first change may correspond to a first, e.g. a $900^{th}$ P/E cycle, and the second change may correspond to a second, e.g. $2100^{th}$ P/E cycle.

Referring to FIG. 14, in an initial P/E cycle stage, the slope of the erase voltage may be set to be relatively great. For example, in the initial stage, a step-up period Ta may be set to be relatively the shortest. For example, the step-up period Ta in the initial stage may be "3 ms".

At the $1000^{th}$ P/E cycle, the slope of the erase voltage may be changed for the first time so as to be smaller than the slope of the erase voltage in the initial stage. For example, a step-up period Tb may be adjusted to be longer than the step-up period Ta in the initial stage. In this case, the rate of increase in the step-up period may be set within an allowable total erasure operation time or within an allowable performance drop range. For example, the step-up period Tb of the erase operation may be adjusted from "3 ms" to "5 ms".

At the $2000^{th}$ P/E cycle, the slope of the erase voltage may be again changed so as to be smaller than the slope of the erase voltage adjusted at the $1000^{th}$ P/E cycle. For example, a step-up period Tc may be adjusted to be longer than the step-up period Tb changed for the first time. In this case, because the rate of increase in the threshold voltage of the dummy memory cell DMC is non-linear, the rate of increase in the step-up period may also be adjusted non-linearly. For example, the step-up period Tc of the erase operation may be adjusted from "5 ms" to "5.5 ms". However, this is provided as an example, and the slope of the erase voltage may linearly increase; in this case, the step-up period Tc of the erase operation may be adjusted from "5 ms" to "7 ms".

As described above, a data storage device according to various example embodiments may change the slope of the erase voltage plural times; in this case, the rate of increase in the erase voltage may be non-linear or linear.

Figure 15:
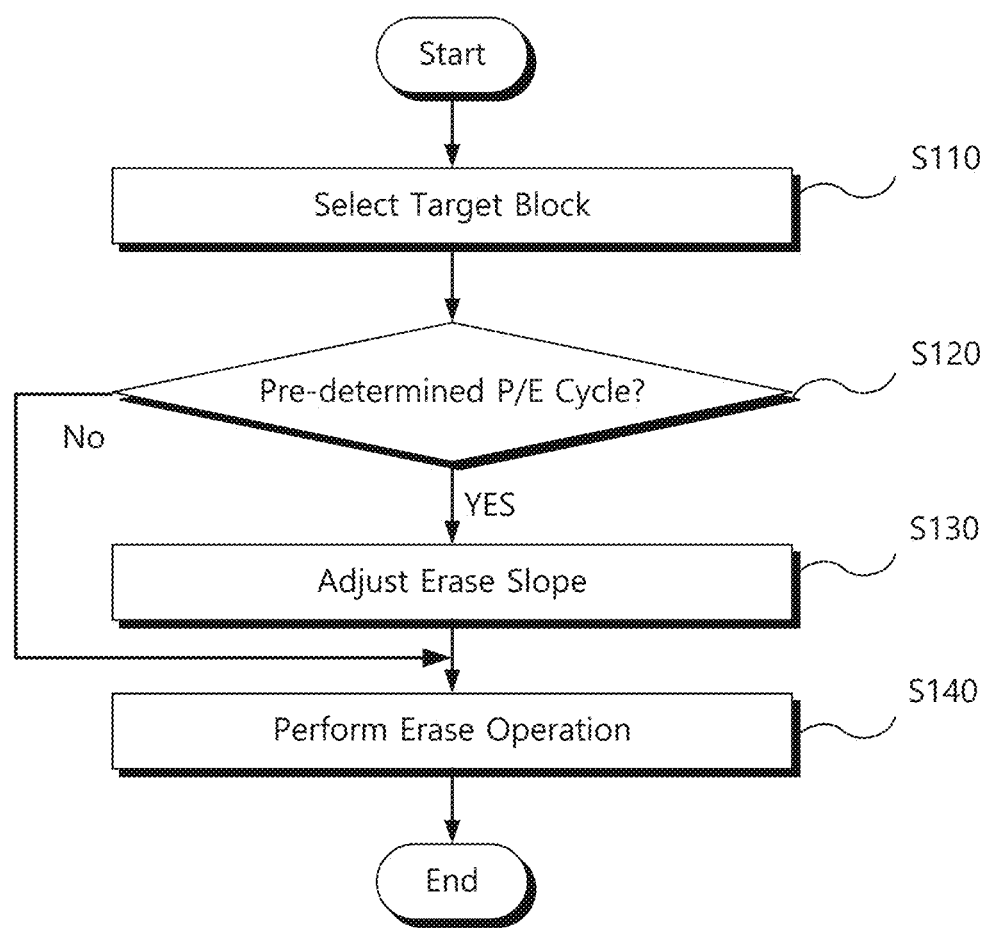
FIG. 15 is a flowchart illustrating an erase operation according to various example embodiments.

FIG. 15 is a flowchart illustrating an erase operation according to various example embodiments.

In operation S110, a memory block targeted for the erase operation may be selected.

In operation S120, whether the number of executed P/E cycles of the selected memory block is a reference count, such as a dynamically determined (or, alternatively, predetermined) reference count may be determined.

When the number of executed P/E cycles is more than the reference count, the slope of the erase voltage may be adjusted to be small (S130). For example, a step-up period for generating the erase voltage may be adjusted to be long. Afterwards, the erase voltage may be generated based on the slope of the erase voltage thus adjusted/changed, and the erase operation may be performed (S140).

Meanwhile, when the number of executed P/E cycles is less than the reference count, the slope of the erase voltage may be maintained without modification.

As described above, the erase operation according to various example embodiments may adjust the slope of the erase voltage based on the number of executed P/E cycles, and thus, the generation of hot carriers may be prevented or reduced.

[Data Storage Device Adjusting Detect Level]

Figure 18:
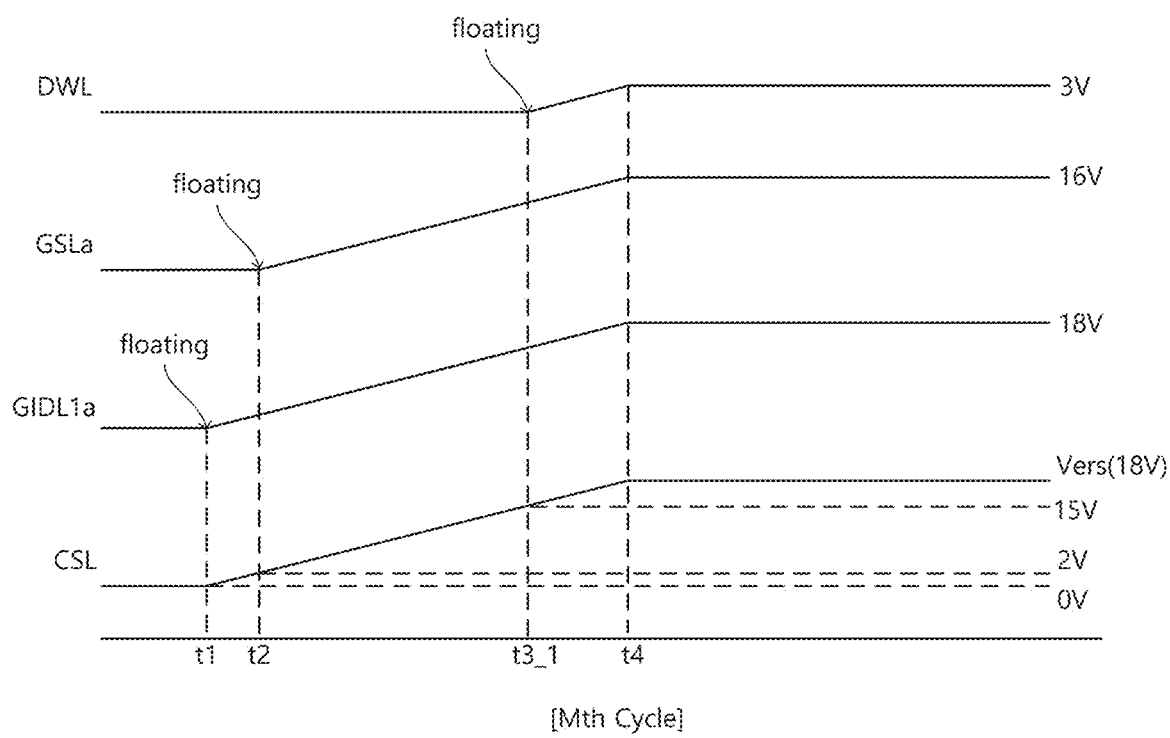
Figure 19:
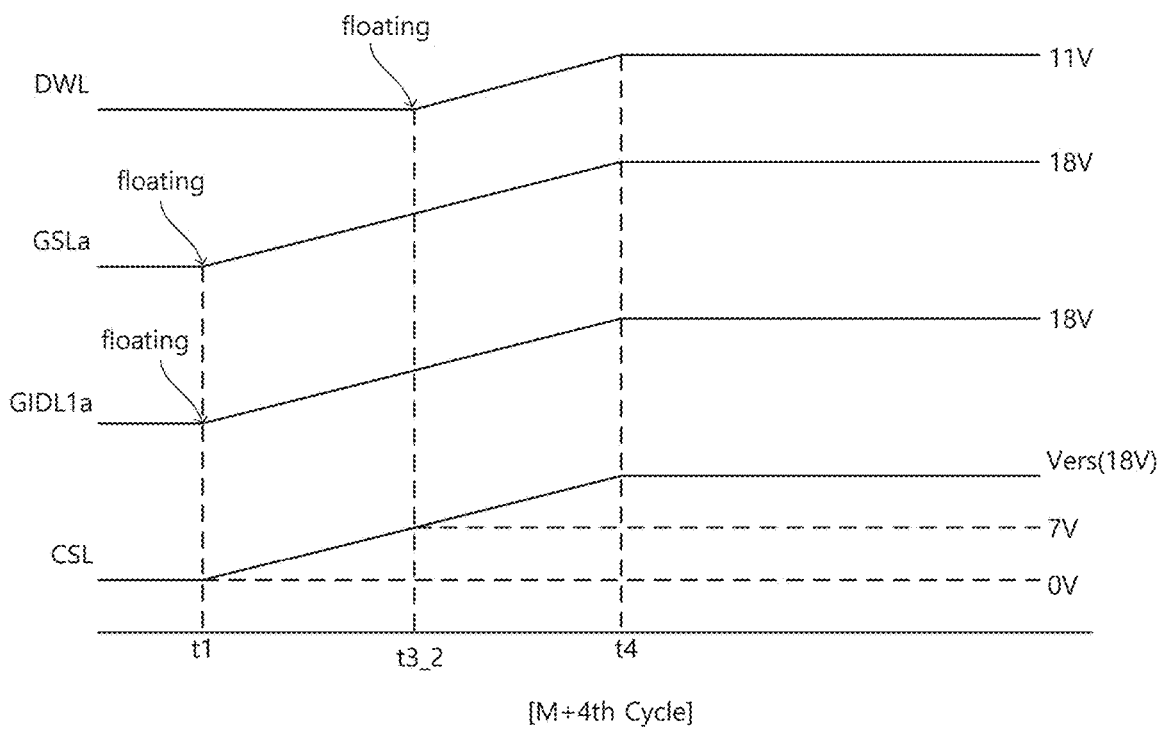
Figure 20:
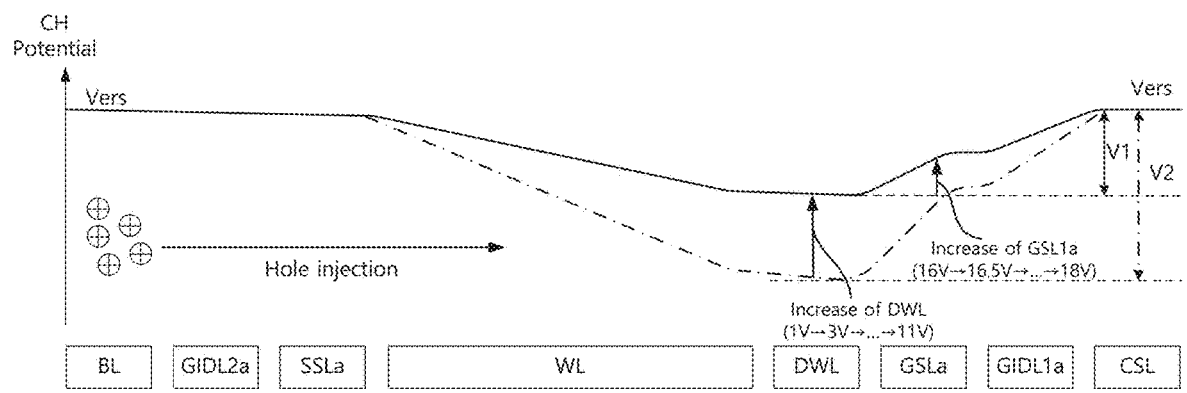
FIG. 20 is a diagram illustrating an example of a channel potential gradient improved by adjusting a detect level.

FIGS. 16 to 19 are diagrams for describing various example embodiments in which a detect level of a dummy word line is adjusted based on the number of executed P/E cycles. FIG. 20 is a diagram illustrating an example of a channel potential gradient improved by adjusting a detect level. For convenience of description, it is assumed that the target voltage level of the erase voltage Vers is 18 V; however, example embodiments are not limited thereto.

Referring to FIG. 16, in the initial P/E cycle stage, the detect level of the dummy word line DWL may be set to 17 V, the detect level of the ground selection line GSLa may be set to 2 V, and the detect level of the first GIDL line GIDL1a may be set to 0 V. Herein, the detect level may mean or refer to the voltage level of the common source line CSL at a time when a relevant row line is floated. As such, in the initial P/E cycle stage, the voltage level of the dummy word line DWL may be 1 V. Also, substantially, the erase voltage of 17 V may be applied to the dummy memory cell DMC corresponding to the dummy word line DWL, and the erase operation for the dummy memory cell DMC may be performed.

Figure 17:
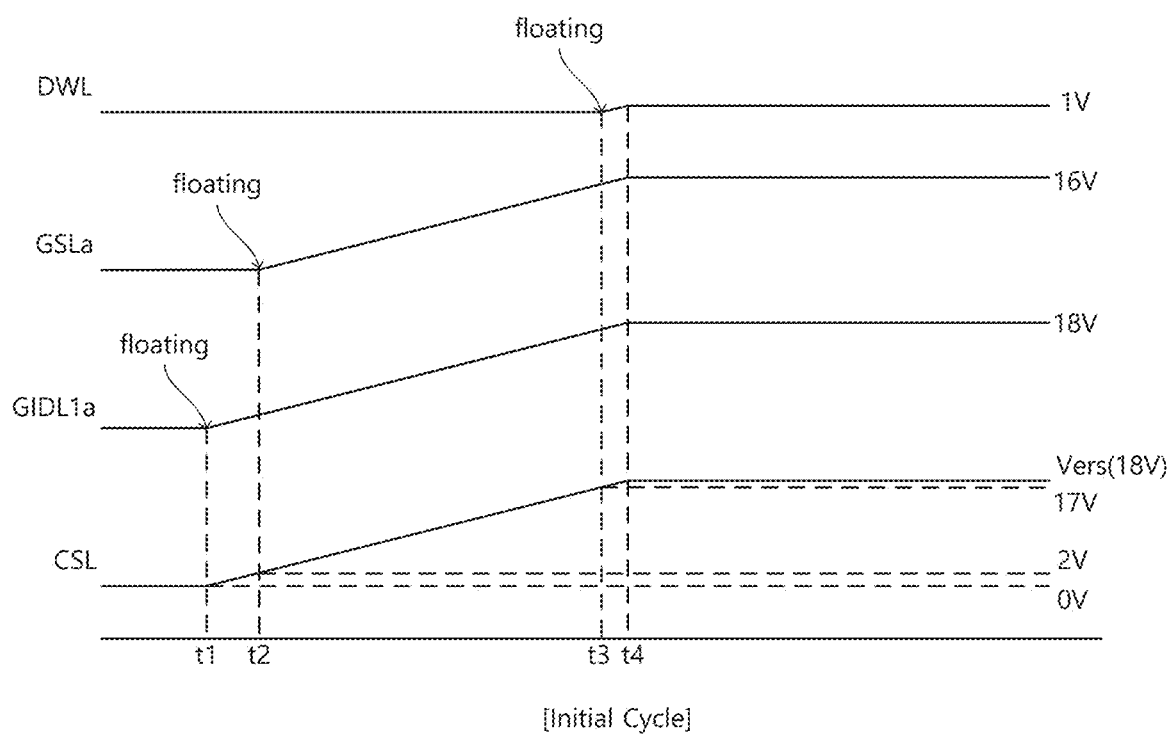

Below, the initial P/E cycle stage will be described in detail with reference to FIG. 17. The erase voltage Vers may be provided to the common source line CSL. The erase voltage Vers provided to the common source line CSL may stepwise increase from 0 V to 18 V during a time period from t1 to t4. Also, the erase voltage Vers provided to the common source line CSL may maintain 18 V after the fourth time t4.

The detect level of the first GIDL line GIDL1a may be 0 V. For example, the first GIDL line GIDL1a may be floated at the first time t1 when the voltage level of the common source line CSL is 0 V. As the first GIDL line GIDL1a is floated at the first time t1, the voltage level of the first GIDL line GIDL1a may increase from 0 V to 18 V during the time period from t1 to t4. Accordingly, a voltage difference of the first GIDL line GIDL1a and the common source line CSL may maintain 0 V. According to the above description, the holes (+) may not be generated at the lower end of the string; alternatively, even though the holes (+) are generated, the injection of the holes (+) into the channel may be blocked or reduced.

The detect level of the ground selection line GSLa may be 2 V. For example, the ground selection line GSLa may maintain 0 V up to the second time t2 and may be floated at the second time t2 when the voltage level of the common source line CSL is 2 V. As the ground selection line GSLa is floated at the second time t2, the voltage level of the ground selection line GSLa may increase from 0 V to 16 V during a time period from t2 to t4. Accordingly, a voltage difference of the ground selection line GSLa and the common source line CSL may maintain 2 V.

The detect level of the dummy word line DWL may be 17 V. For example, the dummy word line DWL may maintain 0 V until the third time t3 and may be floated at the third time t3 when the voltage level of the common source line CSL is 17 V. As the dummy word line DWL is floated at the third time t3, the voltage level of the dummy word line DWL may increase from 0 V to 1 V during a time period from t3 to t4. Accordingly, a voltage difference of the dummy word line DWL and the common source line CSL may maintain 17 V.

As the voltage difference of the dummy word line DWL and the common source line CSL substantially maintains 17 V, the erase voltage of 17 V may be provided to the dummy memory cell DMC corresponding to the dummy word line DWL. Accordingly, in the erase operation of the initial P/E cycle stage, charges injected into the charge storage layer of the dummy memory cell DMC may be removed, and thus, an increase in the threshold voltage of the dummy memory cell DMC may be suppressed.

Returning to FIG. 16, a detect level changing operation may be performed from the M-th P/E cycle to the (M+4)-th P/E cycle.

For example, at the M-th P/E cycle, the detect level of the dummy word line DWL may be set to 15 V. For example, compared to the initial P/E cycle stage, the detect level of the dummy word line DWL may decrease from 17 V to 15 V. As such, at the M-th P/E cycle, the voltage level of the dummy word line DWL may be 3 V. For example, compared to the initial P/E cycle stage, the voltage level of the dummy word line DWL may increase from 1V to 3 V. Also, substantially, the erase voltage of 15 V may be applied to the dummy memory cell DMC corresponding to the dummy word line DWL, and the erase operation for the dummy memory cell DMC may be performed.

Below, the M-th P/E cycle will be described with reference to FIG. 18. The erase voltage Vers provided through the common source line CSL may stepwise increase from 0 V to 18 V during the time period from t1 to t4 and may maintain 18 V after the fourth time t4.

The first GIDL line GIDL1a may be floated at the first time t1 when the voltage level of the common source line CSL is 0 V, and thus, a voltage difference of the first GIDL line GIDL1a and the common source line CSL may maintain 0 V.

The ground selection line GSLa may be floated at the second time when the voltage level of the common source line CSL is 2 V, and thus, the voltage level of the ground selection line GSLa may increase from 0 V to 16 V. A voltage difference of the ground selection line GSLa and the common source line CSL may maintain 2 V.

The detect level of the dummy word line DWL may be 15 V. For example, the dummy word line DWL may maintain 0 V until the (3_1)-th time t3_1 and may be floated at the (3_1)-th time t3_1 when the voltage level of the common source line CSL is 15 V. For example, compared to the initial P/E cycle stage, the dummy word line DWL may be floated more quickly.

As the dummy word line DWL is floated at the (3_1)-th time t3_1, the voltage level of the dummy word line DWL may increase from 0 V to 3 V during a time period from t3_1 to t4. Compared to the case where the voltage level of the dummy word line DWL is 1 V in the initial P/E cycle stage, the voltage level of the dummy word line DWL at the M-th P/E cycle may increase to 3 V. As such, the potential of the channel region adjacent to the dummy word line DWL may become higher compared to the initial P/E cycle stage.

Also, at the M-th P/E cycle, a voltage difference of the dummy word line DWL and the common source line CSL may maintain 15 V. As such, substantially, the erase voltage of 15 V may be provided to the dummy memory cell DMC corresponding to the dummy word line DWL, and the erase operation for the dummy memory cell DMC may be performed.

According to the above description, as the number of P/E cycles increases, the detect level of the dummy word line DWL may be set to be gradually low. For example, as illustrated in FIG. 16, the detect level of the dummy word line DWL may be decreased as much as 2 V whenever the P/E cycle progresses and may be set to 7 V at the (M+4)-th P/E cycle. In this case, as the number of P/E cycles increases, the voltage level of the dummy word line DWL may gradually become higher. For example, the voltage level of the dummy word line DWL may be increased as much as 2 V whenever the P/E cycle progresses and may be to 11 V at the (M+4)-th P/E cycle. As such, as the number of P/E cycles increases, the potential of the channel region adjacent to the dummy word line DWL may gradually become higher.

For example, as illustrated in FIG. 20, the potential of the channel region adjacent to the dummy word line DWL gradually increases from 1 V to 11 V. Accordingly, the distortion of the channel gradient due to an increase in the threshold voltage of the dummy memory cell may be improved. This may mean that the generation of hot carriers is prevented or reduced.

Meanwhile, in various example embodiments, the detect level of the dummy word line DWL may decrease to a level at which the erase operation for the dummy memory cell DMC is possible. For example, it is assumed that the program voltage of 5 V is applied to the dummy memory cell DMC through the dummy word line DWL in the program operation. In this case, as illustrated in FIGS. 16 and 19, the detect level of the dummy word line DWL may be decreased as much as 2 V whenever the P/E cycle progresses and may decrease to 7 V at the (M+4)-th P/E cycle. In this case, in the erase operation, the erase voltage of 7 V greater than the program voltage of 5 V may be applied to the dummy memory cell DMC, and thus, the erase operation for the dummy memory cell DMC may be performed.

Meanwhile, in various example embodiments, as the number of P/E cycles increases, the detect level of the ground selection line GSLa may also be set to be gradually low.

For example, as illustrated in FIG. 16, the detect level of the ground selection line GSLa may be set to be decreased as much as 0.5 V as the P/E cycle progresses. In this case, the voltage level of the ground selection line GSLa may be increased as much as 0.5 V as the P/E cycle progresses. For example, as illustrated in FIGS. 17 to 19, the voltage level of the ground selection line GSLa may be increased as much as 0.5 V whenever the P/E cycle progresses and may increase to 18 V at the (M+4)-th P/E cycle. As such, as the number of P/E cycles increases, the potential of the channel region adjacent to the ground selection line GSLa may gradually become higher. For example, as illustrated in FIG. 20, as the number of P/E cycles increases, the potential of the channel region adjacent to the ground selection line GSLa gradually increases from 16 V to 18 V. Accordingly, the distortion of the channel gradient due to an increase in the threshold voltage of the dummy memory cell may be further improved.

Figure 21:
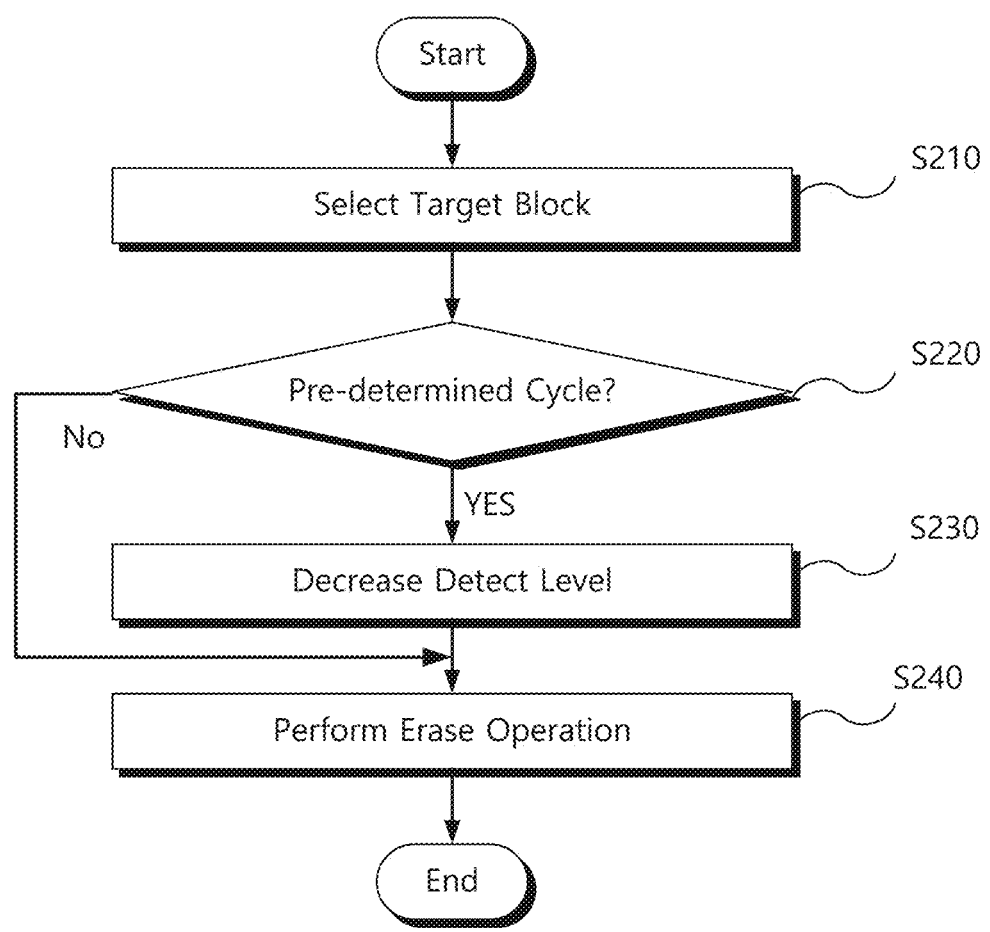
FIG. 21 is a flowchart illustrating an example of an erase operation of various example embodiments, in which a detect level is changed based on the number of executed P/E cycles.

FIG. 21 is a flowchart illustrating an example of an erase operation of various example embodiments, in which a detect level is changed based on the number of executed P/E cycles.

In operation S210, a memory block targeted for the erase operation may be selected.

In operation S220, whether the number of executed P/E cycles of the selected memory block is a count, such as a dynamically determined count (or, alternatively, a pre-determined count) may be determined.

When the number of executed P/E cycles is equal to the above count, the detect level may be changed to become lower (S230). For example, as described with reference to FIGS. 16 to 20, the detect level of the dummy word line may be set to be lower than in the erase operation of the previous P/E cycle. Alternatively, the detect level of the ground selection line may be set to be lower than in the erase operation of the previous P/E cycle. Afterwards, the erase operation may be performed based on the adjusted detect level (S240).

Meanwhile, when the number of executed P/E cycles is not the pre-determined value (or count), the detect level of the row line may be maintained without modification.

As described above, the erase operation according to various example embodiments may change the detect level based on the number of executed P/E cycles, thereby improving the distortion of the channel gradient and preventing the generation of hot carriers.

Figures 22, 23:
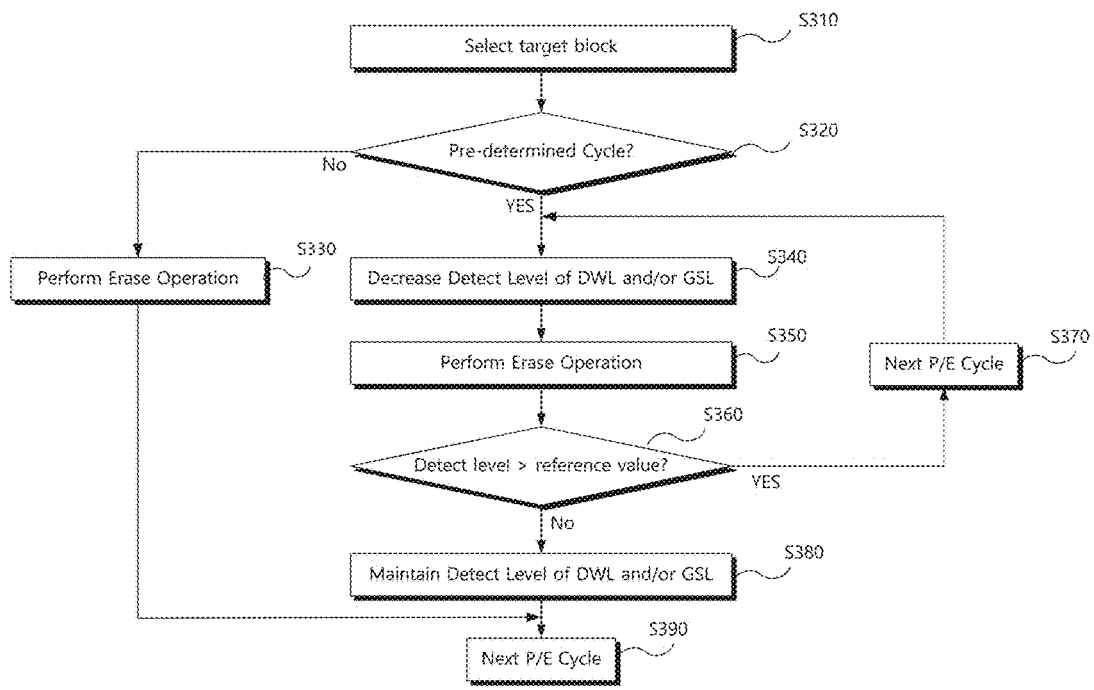

FIG. 22 is a flowchart illustrating an example of an erase operation of various example embodiments, in which a detect level decreases as a P/E cycle progresses.

In operation S310, a memory block targeted for the erase operation may be selected.

In operation S320, whether the number of executed P/E cycles of the selected memory block is a count such as a dynamically determined or pre-determined count (or value) may be determined.

When the number of executed P/E cycles is different from the count, the detect level may be maintained with modification, and the erase operation may be performed (S330).

When the number of executed P/E cycles is equal to the count, the detect level of the dummy word line and/or the detect level of the ground selection line may be changed to be lower than in the previous P/E cycle (S340). Afterwards, in operation S350, the erase operation may be performed based on the adjusted detect level.

In operation S360, whether the detect level of the dummy word line thus changed is greater than a reference value may be determined. Herein, the reference value may refer to a voltage level that is provided to the dummy word line in the program operation.

When the detect level of the dummy word line thus changed is greater than the reference value, a next P/E cycle may progress (S370). When the erase operation of the next P/E cycle is performed, the detect level of the dummy word line or the detect level of the ground selection line may be relatively low compared to the previous P/E cycle.

When the detect level of the dummy word line thus changed is smaller than the reference value, the detect level of the dummy word line and/or the detect level of the ground selection line may be maintained without modification (S380). Afterwards, a next P/E cycle may progress (S390).

As described above, in the erase operation according to various example embodiments, as the number of P/E cycles increases, the detect level of the dummy word line and/or the detect level of the ground selection line may decrease. As such, the generation of hot carriers may be prevented or reduced in likelihood of occurrence and/or of impact from occurrence, and the distortion of the channel may be improved. Alternatively or additionally, at each P/E cycle, the detect level of the dummy word line in the erase operation may be set to be greater than the detect level in the program operation. According to the above description, as the erase operation for the dummy memory cell is performed, the distortion of the channel gradient may be further improved.

Meanwhile, in FIGS. 16 to 20, the description is given as the detect level of the dummy word line is decreased as much as the same voltage magnitude as the P/E cycle progresses. However, this is provided as an example, and various example embodiments is not limited thereto. For example, as illustrated in FIG. 23, the detect level of the dummy word line DWL may decrease non-linearly as the P/E cycle progresses.

Also, in FIGS. 16 to 20, the description is given as the detect level of the dummy word line is set to a high level in the initial P/E cycle stage. However, this is provided as an example, and example embodiments are not limited thereto. For example, as illustrated in FIG. 24, the detect level of the dummy word line DWL may be set to 0 V in the initial P/E cycle stage. In this case, when the number of executed P/E cycles reaches the pre-determined count (or value), the detect level of the dummy word line DWL may be changed to a high voltage level. Afterwards, as the number of P/E cycles increases, the detect level of the dummy word line DWL may gradually decrease.

[Data Storage Device Adjusting Both Erase Voltage Slope and Detect Level]

Figure 25:
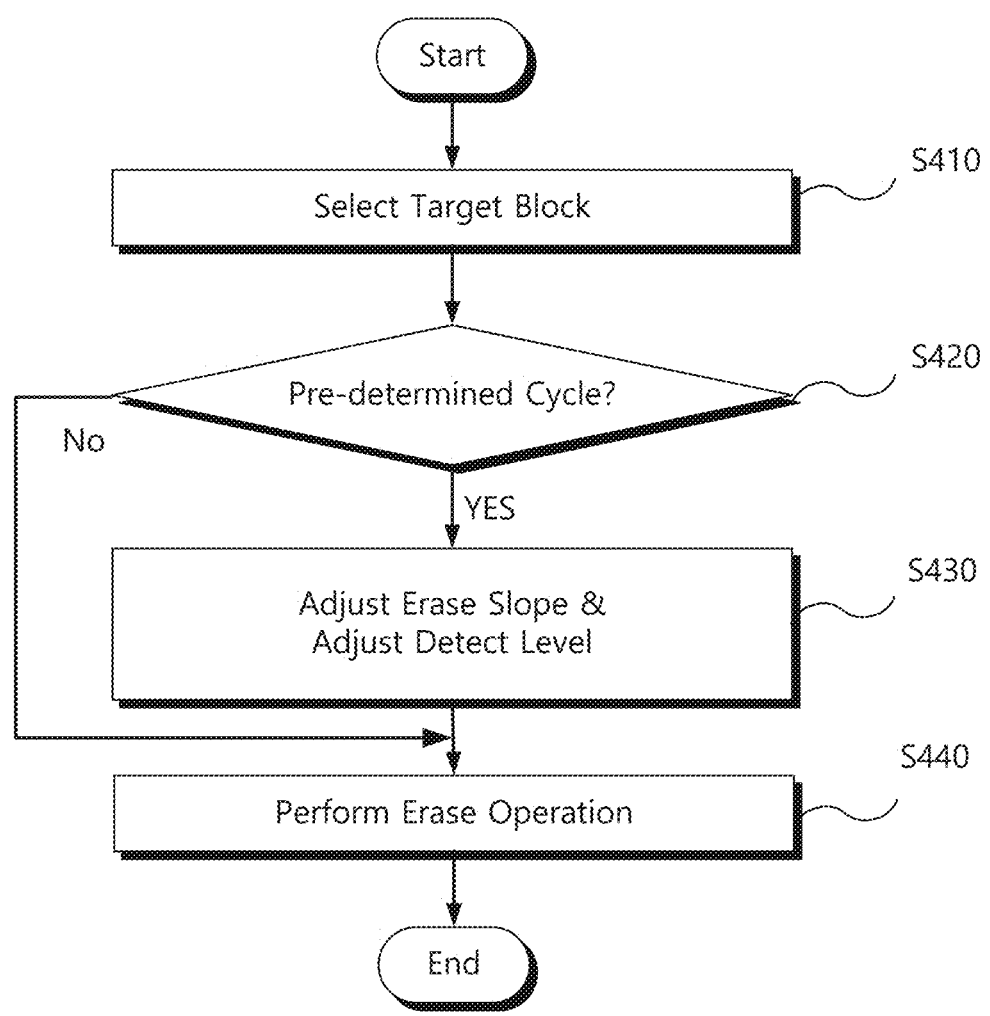
FIG. 25 is a flowchart illustrating an example of an erase operation of the data storage device 1000B according to various example embodiments.

FIG. 25 is a flowchart illustrating an example of an erase operation of the data storage device 1000B according to various example embodiments.

In FIGS. 11 to 24, the description is given as the data storage device 1000B according to various example embodiments adjusts the slope of the erase voltage based on the number of executed P/E cycles or adjusts the detect level of the row line based on the number of executed P/E cycles. However, this is provided as an example, and the data storage device 1000A according to various example embodiments may adjust both the slope of the erase voltage and the detect level of the row line.

This will be described in detail with reference to FIG. 25. In operation S410, a memory block targeted for the erase operation may be selected.

In operation S420, whether the number of executed P/E cycles of the selected memory block is a count such as a dynamically determined (or, alternatively, a pre-determined) count may be determined.

When the number of executed P/E cycles is equal to the count, the slope of the erase voltage and the detect level may be adjusted (S430). For example, the slope of the erase voltage may be adjusted to be smaller than the slope of the erase voltage of the previous P/E cycle, and the detect level of the dummy word line may be adjusted to be lower than the detect level of the previous P/E cycle. Afterwards, the erase operation may be performed based on the adjusted erase voltage slope and the adjusted detect level (S440).

Meanwhile, when the number of executed P/E cycles is not the count, the slope of the erase voltage and the detect level of the row line may be maintained without modification.

As described above, the erase operation according to various example embodiments may adjust both the slope of the erase voltage and the detect level based on the number of executed P/E cycles. As such, the distortion of the channel gradient may be improved more effectively.

[Data Storage Device Dynamically Adjusting Erase Condition in Consideration of Process Deviation for Each Memory Device]

Figure 26:
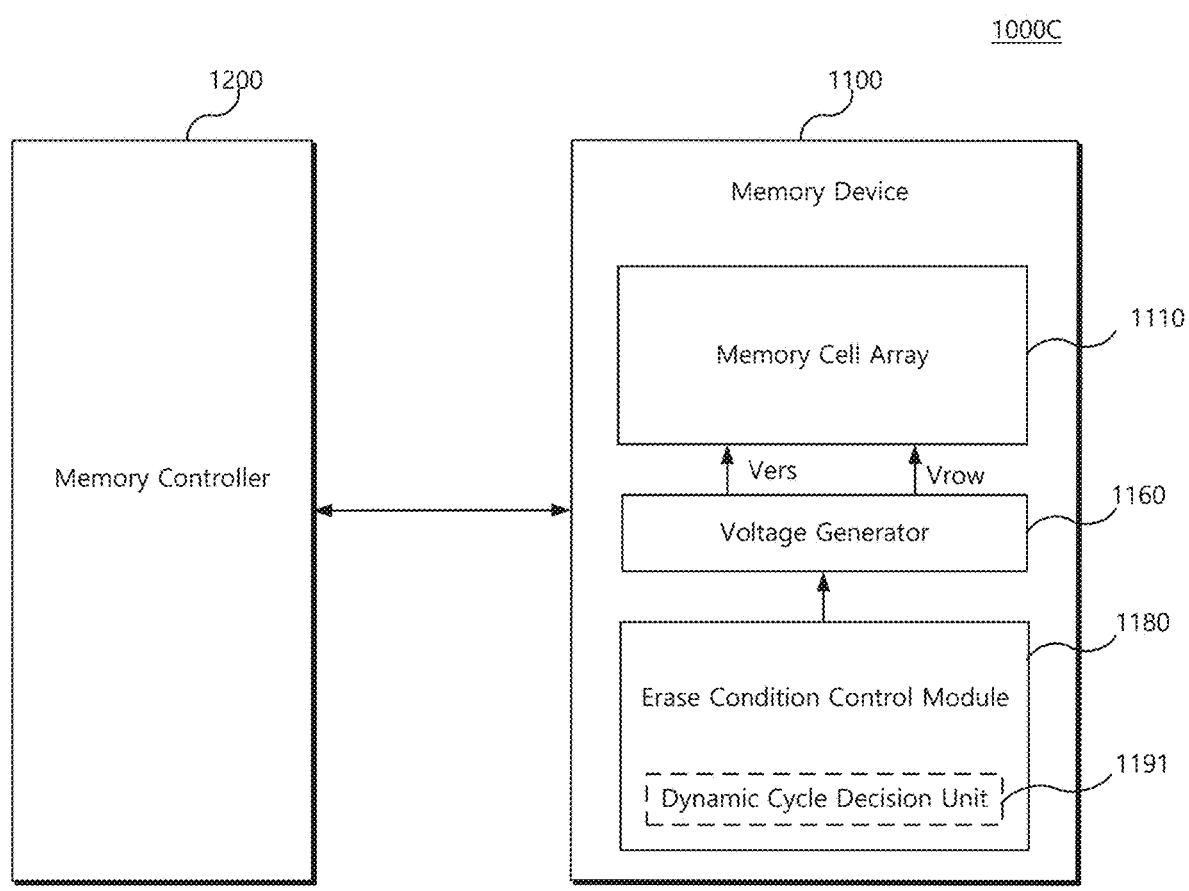
FIG. 26 is a block diagram illustrating a data storage device 1000C according to various example embodiments.

FIG. 26 is a block diagram illustrating a data storage device 1000C according to various example embodiments.

A configuration and an operation of the data storage device 1000C of FIG. 26 are similar to those of the data storage device 1000B of FIG. 10. Accordingly, the same or similar components may be marked by the same or similar reference numerals/signs, and additional description associated with the same or similar components will be omitted to repeated redundancy.

Unlike the data storage device 1000B of FIG. 10, which changes the erase condition based on the pre-determined number of P/E cycles (or the pre-determined count or value), the data storage device 1000C of FIG. 26 may change the erase condition based on a variation of a threshold voltage of a transistor due to a process deviation for each memory device. To this end, the erase condition control module 1180 of the memory device 1100 may include a dynamic cycle decision unit 1191.

The dynamic cycle decision unit 1191 may check a variation of a threshold voltage of a transistor. For example, the dynamic cycle decision unit 1191 may check a variation of a threshold voltage of one of the dummy memory cells DMCs, the ground selection transistors GSTs, and the first GIDL transistors GDT1s.

When the variation of the threshold voltage of the transistor is a reference value or more, the dynamic cycle decision unit 1191 may change the erase condition. For example, when the variation of the threshold voltage of the transistor is the reference value or more, the dynamic cycle decision unit 1191 may adjust the erase voltage slope and/or the detect level.

In general, due to the process deviation, memory devices may be different in a variation of a threshold voltage of a transistor according to the execution of the P/E cycle. The data storage device 1000C according to various example embodiments may consider a process deviation for each memory device by changing the erase condition based on a result of checking a threshold voltage(s) of a transistor(s) for each memory device.

Figure 27:
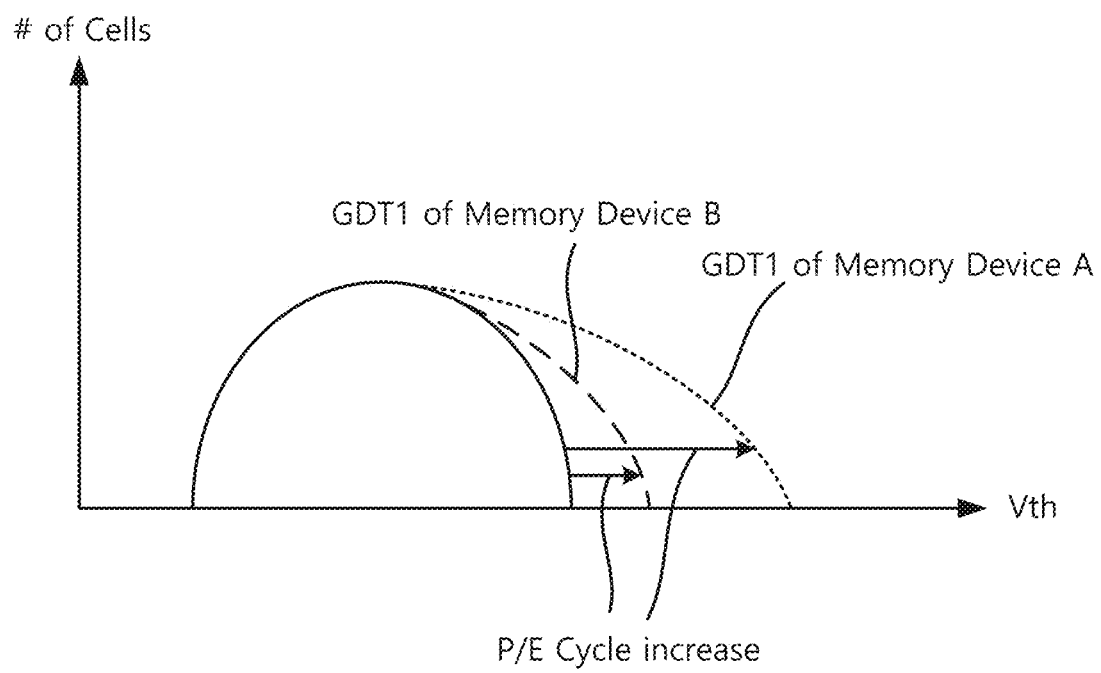
FIG. 27 is a diagram for describing a variation of a threshold voltage of a transistor for each memory device due to a process deviation.
Figure 28:
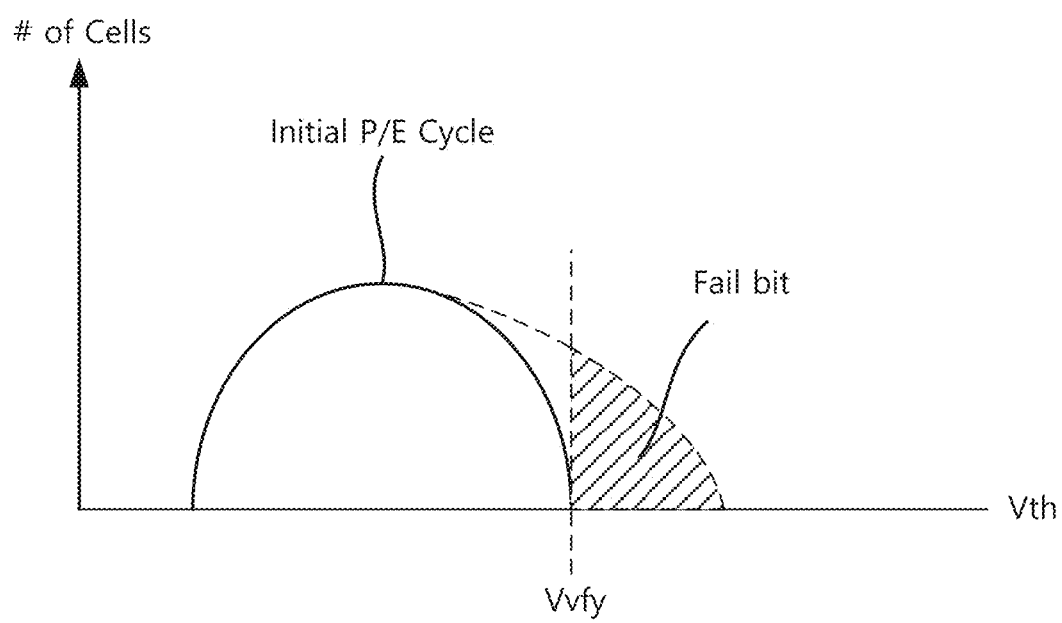
FIG. 28 is a diagram for describing an example of checking whether a variation of a threshold voltage is greater than a reference value.

FIG. 27 is a diagram for describing a variation of a threshold voltage of a transistor for each memory device due to a process deviation. FIG. 28 is a diagram for describing an example of checking whether a variation of a threshold voltage is greater than a reference value. For convenience of description, in FIGS. 27 and 28, it is assumed that a threshold voltage of the first GIDL transistor GDT1 is checked.

Referring to FIG. 27, due to a process deviation for each memory device, as the P/E cycle progresses, a variation of the threshold voltage of the first GIDL transistor GDT1 may differ for each memory device. For example, even though memory devices "A" and "B" have the same number of P/E cycles, the variation of the threshold voltage of the first GIDL transistor GDT1 in the memory device "A" may be greater than the variation of the threshold voltage of the first GIDL transistor GDT1 in the memory device "B". In this case, to improve the channel distortion effectively, an erase condition changing operation of the memory device "A" needs to be performed prior to the memory device "B".

Referring to FIG. 28, the dynamic cycle decision unit 1191 (refer to FIG. 26) may check whether the variation of the threshold voltage is greater than the reference value, through the verify read operation for the first GIDL transistor GDT1. For example, as illustrated in FIG. 28, a verify read voltage Vvfy may be provided to the gate of the first GIDL transistor GDT1. The verify read voltage Vvfy may be determined based on a threshold voltage distribution of the first GIDL transistors GDT1 in the initial P/E cycle stage. For example, the verify read voltage Vvfy may be set to a voltage level at which all the first GIDL transistors GDT1 are turned on in the initial P/E cycle stage.

As the number of P/E cycles increases, the threshold voltages of the first GIDL transistors GDT1 may gradually increase. Accordingly, as the number of P/E cycles increases, the number of first GIDL transistors GDT1 turned off in the verify read operation may gradually increase. The dynamic cycle decision unit 1191 may manage the number of first GIDL transistors GDT1 turned off in the verify read operation as a fail bit. When the number of fail bits is more than a reference value, the dynamic cycle decision unit 1191 may perform an operation of adjusting the erase condition.

Figure 29:
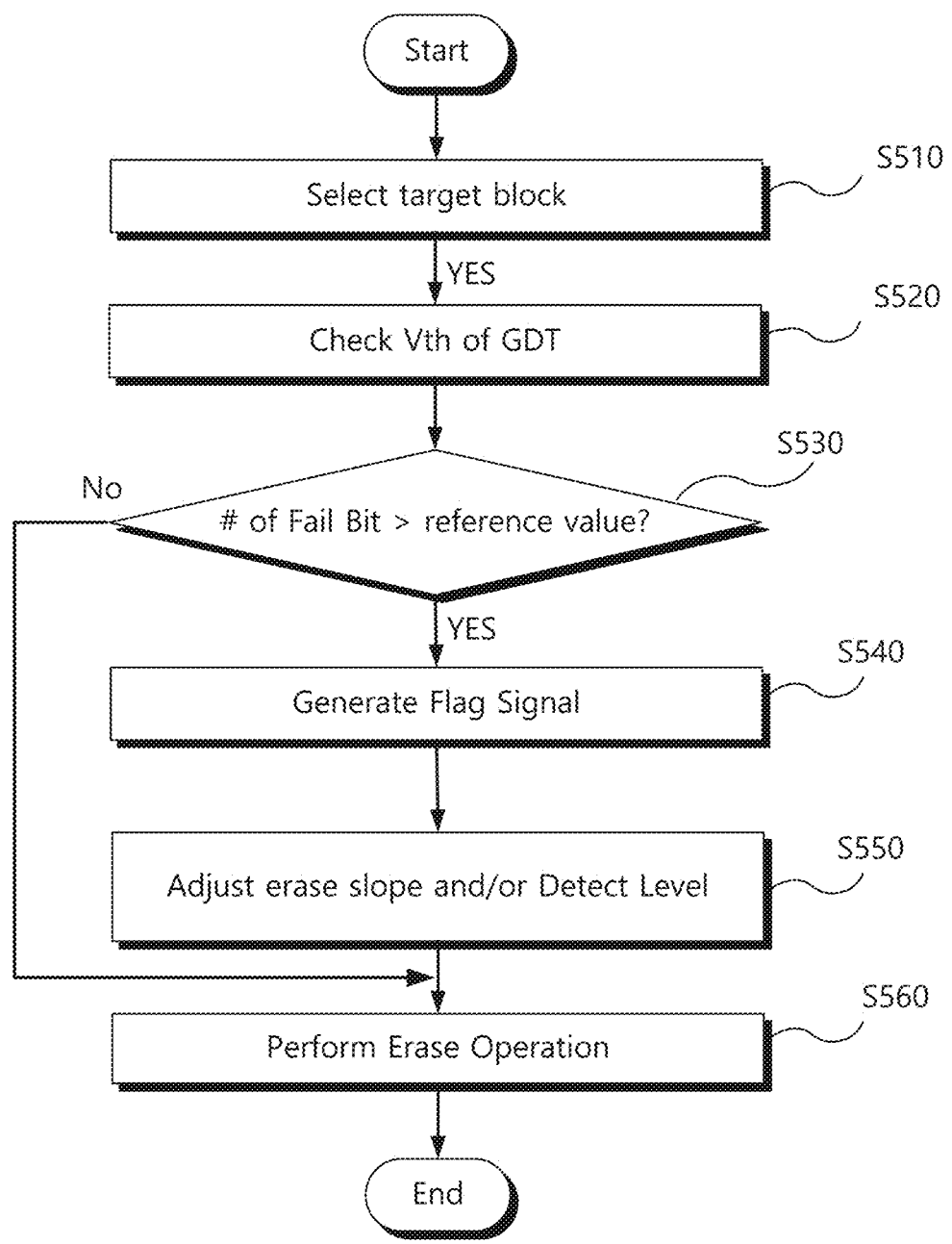
FIG. 29 is a flowchart illustrating an example of an erase operation of the data storage device 1000C of FIG. 26.

FIG. 29 is a flowchart illustrating an example of an erase operation of the data storage device 1000C of FIG. 26.

In operation S510, a memory block targeted for the erase operation may be selected.

In operation S520, a threshold voltage of a transistor may be checked. For example, as described with reference to FIG. 28, the threshold voltage of the first GIDL transistor GDT1 may be checked by performing the verify read operation on the first GIDL transistor GDT1 by using the verify read voltage Vvfy.

In operation S350, whether the number of fail bits derived from a result of the verify read operation is greater than the reference value is determined.

When the number of fail bits is greater than the reference value, a flag signal may be generated (S540). For example, the memory device 1100 may generate the flag signal and may provide the flag signal to the memory controller 1200. As such, the memory controller 1200 may check that the erase condition will be changed. Afterwards, the erase voltage slope and/or the detect level may be changed (S550), and the erase operation may be performed based on the changed erase voltage slope and/or the changed detect level (S560).

When the number of fail bits is smaller than the reference value, the erase voltage slope and/or the detect level may not be changed, and the erase operation may be performed under the erase condition of the previous P/E cycle (S560).

Meanwhile, according to various example embodiments, the generation of the flag signal in operation S540 may be omitted.

Figure 30:
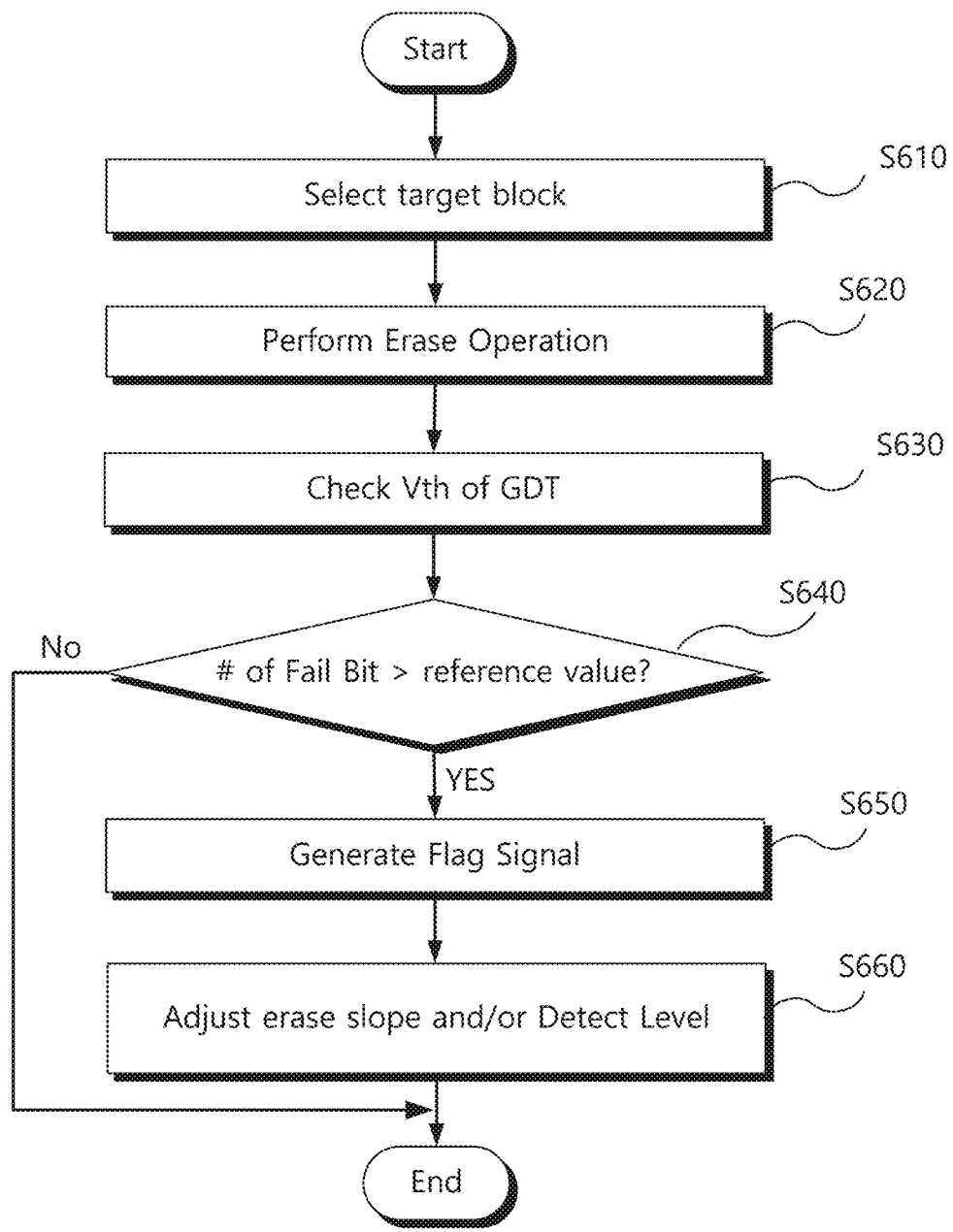
FIG. 30 is a flowchart illustrating another example of an erase operation of the data storage device 1000C of FIG. 26.

FIG. 30 is a flowchart illustrating another example of an erase operation of the data storage device 1000C of FIG. 26.

In operation S610, a memory block targeted for the erase operation may be selected.

In operation S620, the erase operation may be performed on the selected memory block.

In operation S630, a threshold voltage of a transistor may be checked. For example, after the erase operation is performed, the threshold voltage of the first GIDL transistor GDT1 may be checked by using the verify read voltage Vvfy.

In operation S640, whether the number of fail bits derived from a result of the verify read operation is greater than the reference value is determined.

When the number of fail bits is greater than the reference value, a flag signal may be generated (S650). For example, the memory device 1100 may generate the flag signal and may provide the flag signal to the memory controller 1200. The memory controller 1200 may determine that threshold voltages of transistors of the memory block where the erase operation is performed are abnormal, based on the flag signal. In this case, the memory controller 1200 may request the memory device 1100 to perform the erase condition changing operation. Afterwards, the erase voltage slope and/or the detect level to be used at a next P/E cycle may be changed (S650).

As described above, the memory device 1100 may provide the memory controller 1200 with the flag signal indicating a state of the memory block after the erase operation, and the memory controller 1200 may change the erase condition to be used at the next P/E cycle.

[Data Storage Device Adjusting Erase Condition in Consideration of Pre-Determined Number of P/E Cycles and Process Deviation for Each Memory Device]

Figure 31:
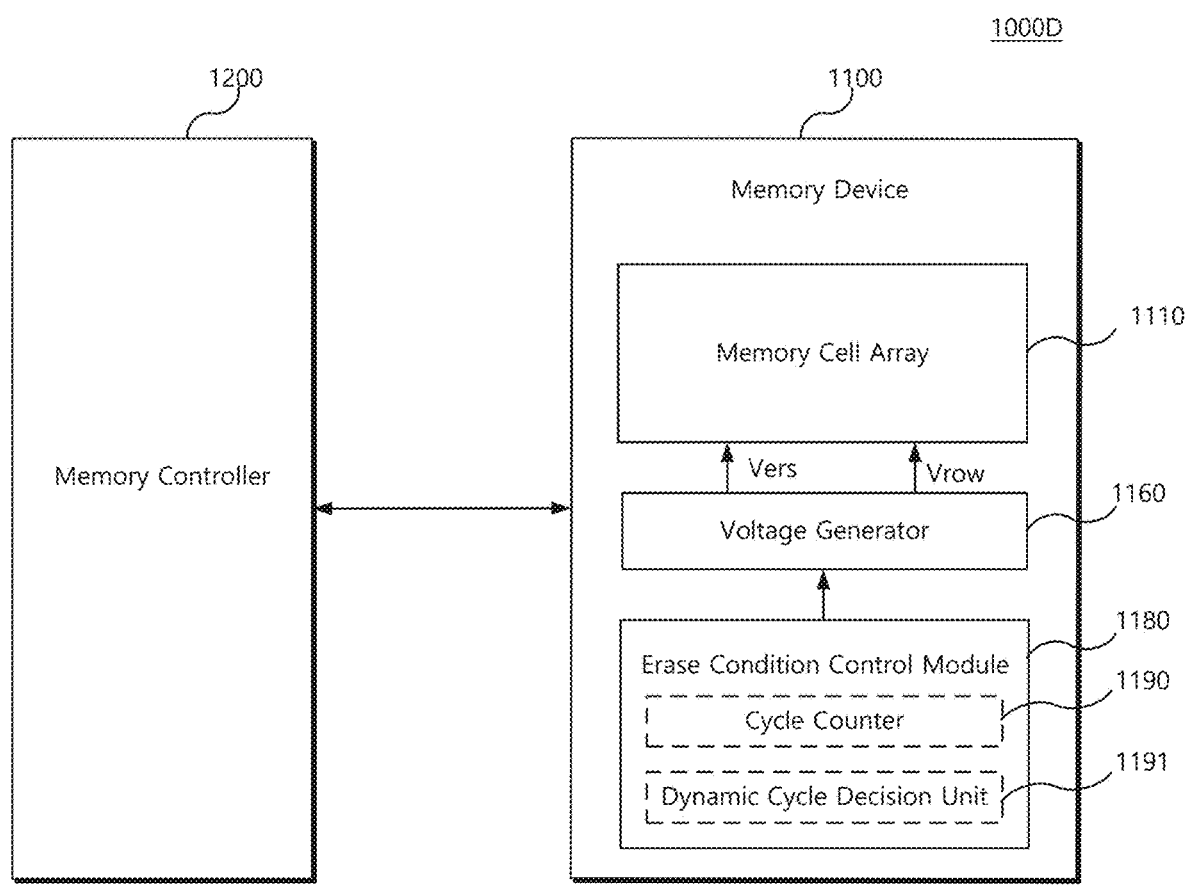
FIG. 31 is a block diagram illustrating a data storage device 1000D according to various example embodiments.

FIG. 31 is a block diagram illustrating a data storage device 1000D according to various example embodiments. A configuration and an operation of the data storage device 1000D of FIG. 31 is similar to those of the data storage devices 1000B and 1000C of FIGS. 10 and 26. Accordingly, the same or similar components may be marked by the same or similar reference numerals/signs, and additional description associated with the same or similar components will be omitted to repeated redundancy.

Referring to FIG. 31, the data storage device 1000D according to various example embodiments may not only adjust the erase condition based on the number of P/E cycles, but it may also adjust the erase condition dynamically in consideration of a process deviation for each memory device. To this end, the erase condition control module 1180 of the memory device 1100 may include the cycle counter 1190 and the dynamic cycle decision unit 1191.

The cycle counter 1190 may count the number of executed P/E cycles and may manage a counting result. The cycle counter 1190 may notify the dynamic cycle decision unit 1191 that the number of executed P/E cycles of a memory block targeted for the erase operation is equal to or greater than the pre-determined count.

When the number of executed P/E cycles of the target block is equal to or greater than the count, the dynamic cycle decision unit 1191 may check a variation of a threshold voltage of a transistor in the target block. For example, as described with reference to FIG. 28, the dynamic cycle decision unit 1191 may check a variation of a threshold voltage through the verify read operation for the first GIDL transistor GDT1.

Figure 32:
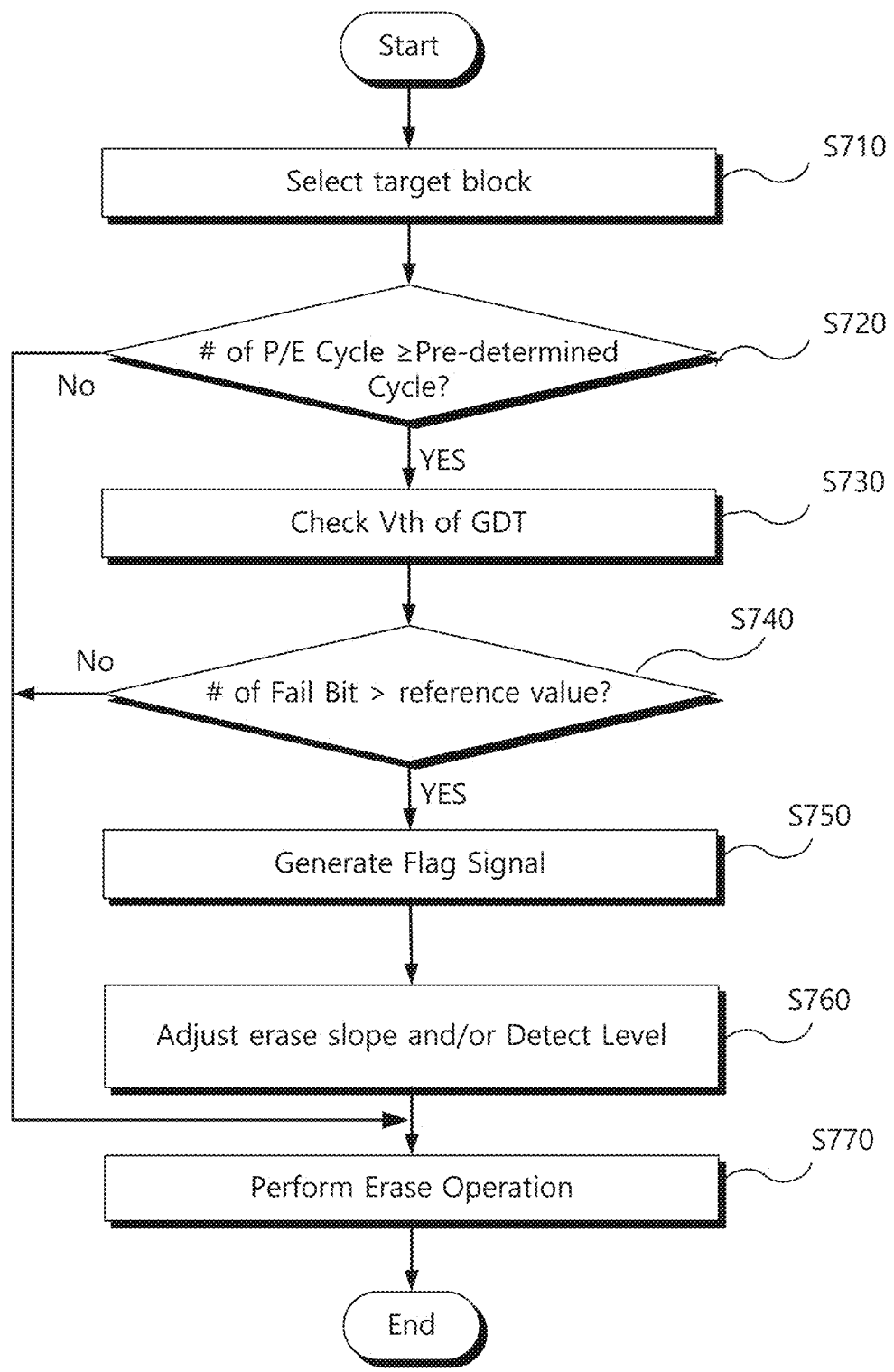
FIG. 32 is a flowchart illustrating an example of an erase operation of the data storage device 1000D of FIG. 31.

FIG. 32 is a flowchart illustrating an example of an erase operation of the data storage device 1000D of FIG. 31.

In operation S710, a memory block targeted for the erase operation may be selected.

In operation S720, whether the number of executed P/E cycles of the selected memory block is equal to or greater than the pre-determined count (or value) may be determined.

When the number of executed P/E cycles is equal to or greater than the pre-determined count, operation S730, that is, the checking of the variation of the threshold voltage may be performed. When the number of executed P/E cycles is smaller than the pre-determined count, the erase operation may be performed under the erase condition identical to that of the previous P/E cycle (S770).

In operation S730, the threshold voltage of the transistor may be checked. For example, as described with reference to FIG. 28, the threshold voltage of the first GIDL transistor GDT1 may be checked by performing the verify read operation on the first GIDL transistor GDT1 by using the verify read voltage Vvfy.

In operation S740, whether the number of fail bits derived from a result of the verify read operation is greater than the reference value may be determined.

When the number of fail bits is greater than the reference value, a flag signal may be generated (S750). Afterwards, the erase voltage slope and/or the detect level may be changed (S760), and the erase operation may be performed based on the changed erase voltage slope and/or the changed detect level (S770).

Meanwhile, when the number of fail bits is smaller than the reference value, the erase voltage slope and/or the detect level may be maintained, and the erase operation may be performed under the erase condition of the previous P/E cycle (S770).

As such, whether to change the erase condition may be efficiently determined by checking the variation of the threshold voltage of the GIDL transistor only when the number of executed P/E cycles is equal to the pre-determined count.

Meanwhile, in FIGS. 1 to 32, the description is given as whether to change the erase condition is determined by the memory device 1100. However, this is provided as an example, and example embodiments are not limited thereto. For example, whether to change the erase condition may be determined by the memory controller 1200. Below, example embodiments in which the memory controller 1200 determines whether to change the erase condition will be described in detail.

[Memory Controller Including Erase Condition Manager]

Figure 33:
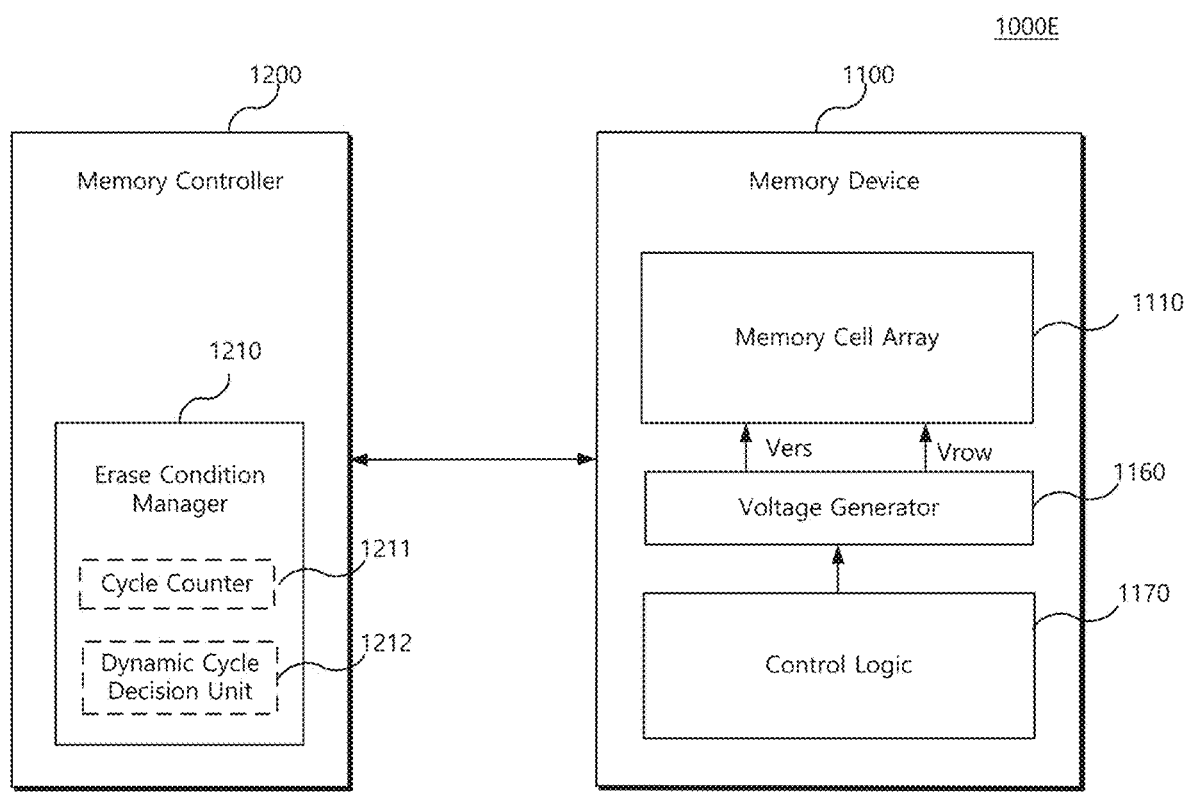
FIG. 33 is a block diagram illustrating a data storage device 1000E according to various example embodiments.

FIG. 33 is a block diagram illustrating a data storage device 1000E according to various example embodiments. A configuration and an operation of the data storage device 1000E of FIG. 33 is similar to those of the data storage devices 1000B, 1000C, and 1000D of FIGS. 10, 21, and 31. Accordingly, the same or similar components may be marked by the same or similar reference numerals/signs, and additional description associated with the same or similar components will be omitted to repeated redundancy.

Unlike the data storage devices 1000B, 1000C, and 1000D in which the memory device 1100 determines whether to change the erase condition, in the case of the data storage device 1000E of FIG. 33, the memory controller 1200 may determine whether to change the erase condition. To this end, the memory controller 1200 of the data storage device 1000E may include an erase condition manager 1210.

The erase condition manager 1210 may determine whether to change the erase condition of the memory device 1100.

In various example embodiments embodiment, the erase condition manager 1210 may include a cycle counter 1211, and the cycle counter 1211 may count the number of executed P/E cycles for each memory block of the memory device 1100 and may manage a counting result. When the number of executed P/E cycles is equal to a pre-determined count, the erase condition manager 1210 may allow the memory device 1100 to change the erase voltage slope and/or the detect level.

In some example embodiments, the erase condition manager 1210 may include a dynamic cycle decision unit 1212, and the dynamic cycle decision unit 1212 may check a threshold voltage variation of a transistor in consideration of a process deviation of the memory device 1100. For example, the dynamic cycle decision unit 1212 may allow the memory device 1100 to perform the verify read operation for the first GIDL transistor GDT1, and the memory device 1100 may perform the verify read operation under control of the dynamic cycle decision unit 1212. The dynamic cycle decision unit 1212 may receive information about the number of fail bits derived from a result of the verify read operation from the memory device 1100 and may determine whether the number of fail bits is a reference count or more. When the number of fail bits is the reference count or more, the erase condition manager 1210 may allow the memory device 1100 to change the erase voltage slope and/or the detect level.

In some example embodiments, the erase condition manager 1210 may include the cycle counter 1211 and the dynamic cycle decision unit 1212. The cycle counter 1211 may count the number of executed P/E cycles for each memory block of the memory device 1100 and may manage a counting result. When the number of executed P/E cycles of a memory block targeted for the erase operation is equal to or greater than the pre-determined count, the cycle counter 1211 may provide information about the target block to the dynamic cycle decision unit 1212. When the number of executed P/E cycles of the target block is equal to or greater than the dynamically determined or pre-determined count, the dynamic cycle decision unit 1212 may check a variation of a threshold voltage of a transistor in the target block. When a result of checking the threshold voltage variation indicates that the number of fail bits is the reference count or more, the erase condition manager 1210 may allow the memory device 1100 to change the erase voltage slope and/or the detect level.

As described above, the data storage device 1000E according to various example embodiments may determine whether to change the erase condition at the memory controller 1200.

Figure 34:
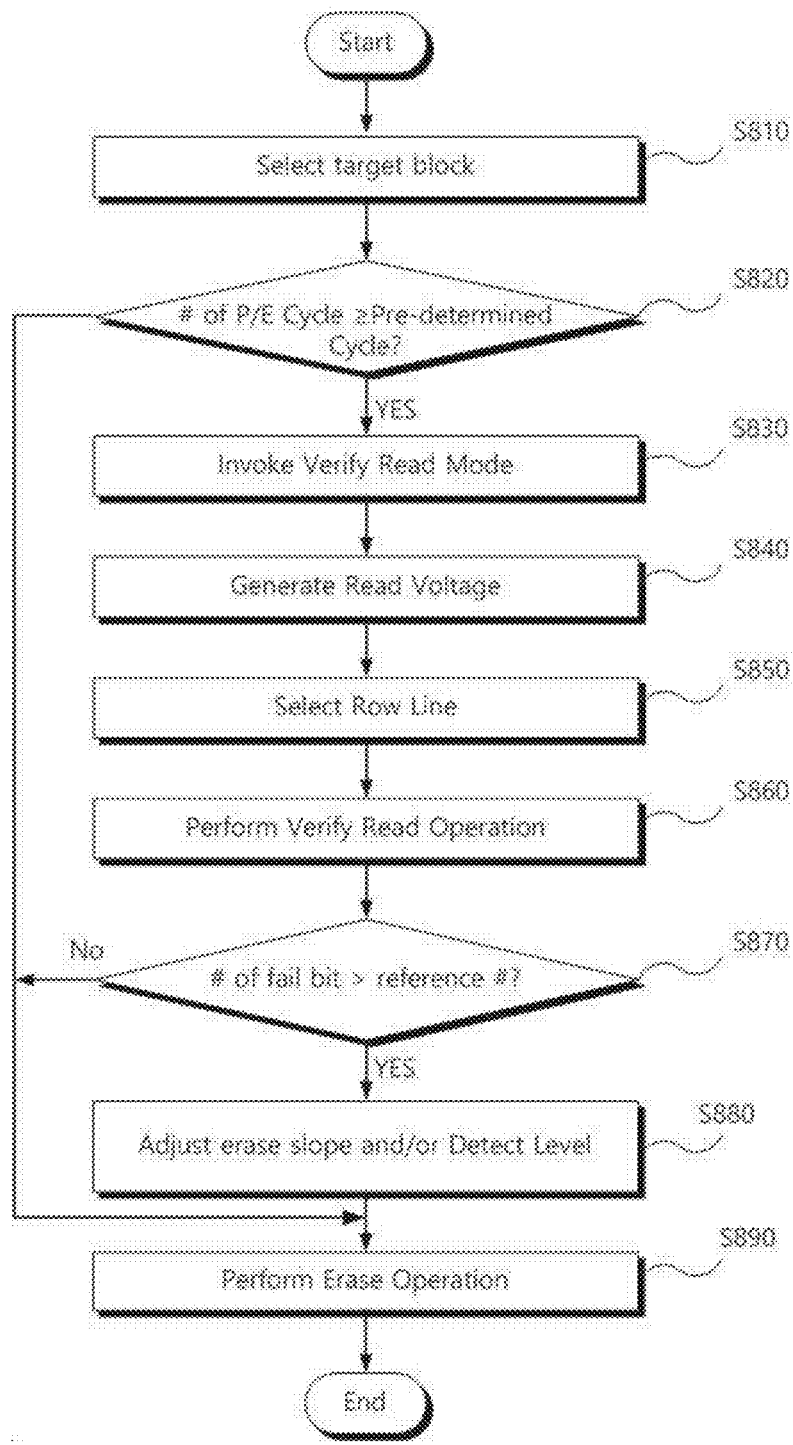
FIG. 34 is a flowchart illustrating an example of an erase operation of the data storage device 1000E of FIG. 33.

FIG. 34 is a flowchart illustrating an example of an erase operation of the data storage device 1000E of FIG. 33.

In operation S810, a memory block targeted for the erase operation may be selected.

In operation S820, the memory controller 1200 may determine whether the number of executed P/E cycles of a memory block targeted for the erase operation is equal to or greater than the dynamically determined or pre-determined count.

When the number of executed P/E cycles is smaller than the pre-determined count, the memory controller 1200 may not change the erase condition. In this case, the memory device 1100 may perform the erase operation under the erase condition the same as that of the previous P/E cycle (S890).

When the number of executed P/E cycles is equal to or greater than the pre-determined count, operation S830 may be performed.

In operation S830, the memory controller 1200 may request the verify read operation from the memory device 1100.

In operation S840, the memory device 1100 may generate the verify read voltage Vvfy in response to the request of the memory controller 1200. For example, as described with reference to FIG. 28, the verify read voltage Vvfy may be generated in consideration of the threshold voltage in the initial P/E cycle stage.

In operation S850, a row line to which the verify read voltage Vvfy is to be provided may be selected. For example, as described with reference to FIGS. 27 and 28, the first GIDL line GIDL1a connected with the first GIDL transistor GDT1 may be selected.

In S860, the verify read operation may be performed. For example, the number of first GIDL transistors GDT1 that are determined as being turned off in the verify read operation may correspond to the number of fail bits, and the memory device 1100 may provide information about the number of fail bits to the memory controller 1200.

In operation S870, whether the number of fail bits is greater than the reference value may be determined.

When the number of fail bits is greater than the reference value, the memory controller 1200 may allow the memory device 1100 to change the erase voltage slope and/or the detect level. The memory device 1100 may adjust the erase voltage slope and/or the detect level under control of the memory controller 1200 (S880). Afterwards, the erase operation may be performed depending on the adjusted erase voltage slope and/or the adjusted detect level (S890).

When the number of fail bits is smaller than the reference value, the erase voltage slope and/or the detect level may not be changed, and the memory device 1100 may perform the erase operation by using the erase condition the same as that of the previous P/E cycle (S890).

As described above, in the data storage device 1000E according to various example embodiments, the memory controller 1200 may determine whether to change the erase condition.

[Update of Erase Condition When UIB User Information Block (UIB) Address of Secure Block Is Open to Memory Controller]

Figure 35:
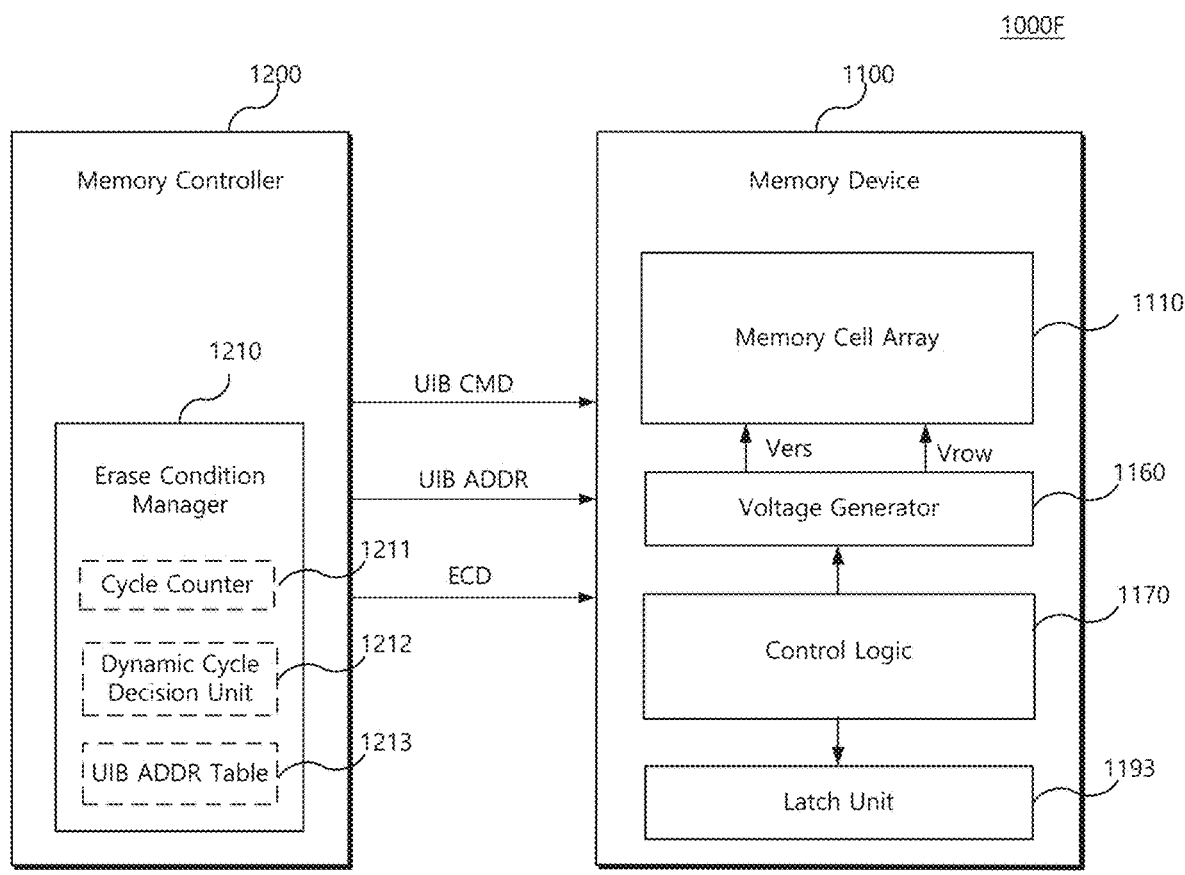
FIG. 35 is a block diagram illustrating a data storage device 1000F according to various example embodiments.
Figure 36:
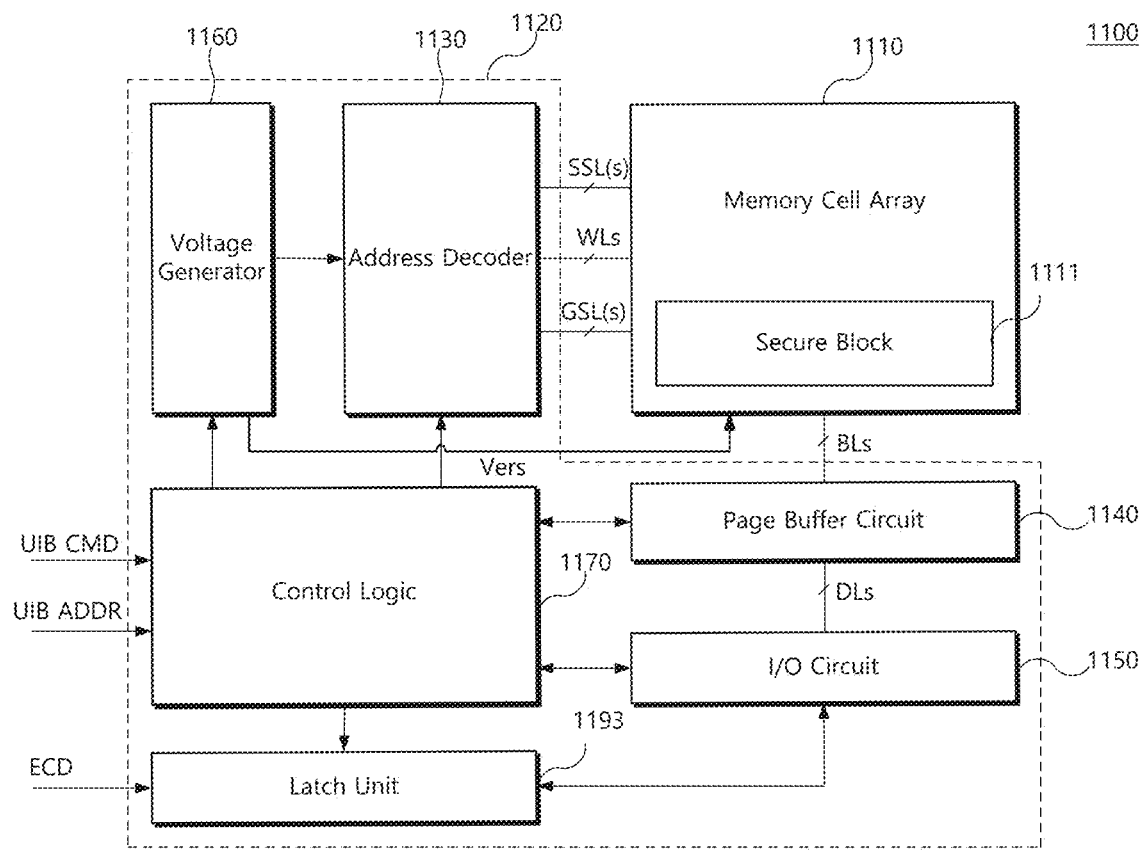
FIG. 36 is a diagram illustrating an example of the memory device 1100 of the data storage device 1000F of FIG. 35.

FIG. 35 is a block diagram illustrating a data storage device 1000F according to various example embodiments. FIG. 36 is a diagram illustrating an example of the memory device 1100 of the data storage device 1000F of FIG. 35. A configuration and an operation of the data storage device 1000F of FIG. 35 are similar to those of the data storage device 1000E of FIG. 33. Accordingly, the same or similar components may be marked by the same or similar reference numerals/signs, and additional description associated with the same or similar components will be omitted to repeated redundancy.

The memory controller 1200 of the data storage device 1000F of FIG. 35 may determine whether to change the erase condition of the memory device 1100 based on the number of executed P/E cycles and/or a variation of a threshold voltage of a transistor and may update the memory device 1100 with a determination result. To this end, compared to the data storage device 1000E of FIG. 33, the memory device 1100 of the data storage device 1000F of FIG. 35 may further include a latch unit 1193, and the memory controller 1200 may further include an UIB address table 1213.

Below, the description will be given in detail with reference to FIGS. 35 and 36. When the memory device 1100 is powered up, data on the erase condition stored in a secure block 1111 of the memory cell array 1110 may be loaded to the latch unit 1193. The secure block 1111 may be, for example, an OTP block and may store characteristic data according to a test result of the memory device 1100 and/or data on the product specification of the memory device 1100.

When the change of the erase condition is determined, the memory controller 1200 may provide the memory device 1100 with an UIB command UIB CMD, an UIB address UIB ADDR, and adjusted erase condition data ECD.

The control logic 1170 of the memory device 1100 may receive the UIB command UIB CMD and the UIB address UIB ADDR. The control logic 1170 may check memory regions, in which the erase condition data are stored, from among memory regions included in the latch unit 1193, based on the UIB address UIB ADDR. The control logic 1170 may update data stored in the memory regions so as to be set to the changed erase condition data ECD received from the memory controller 1200.

Figure 38:
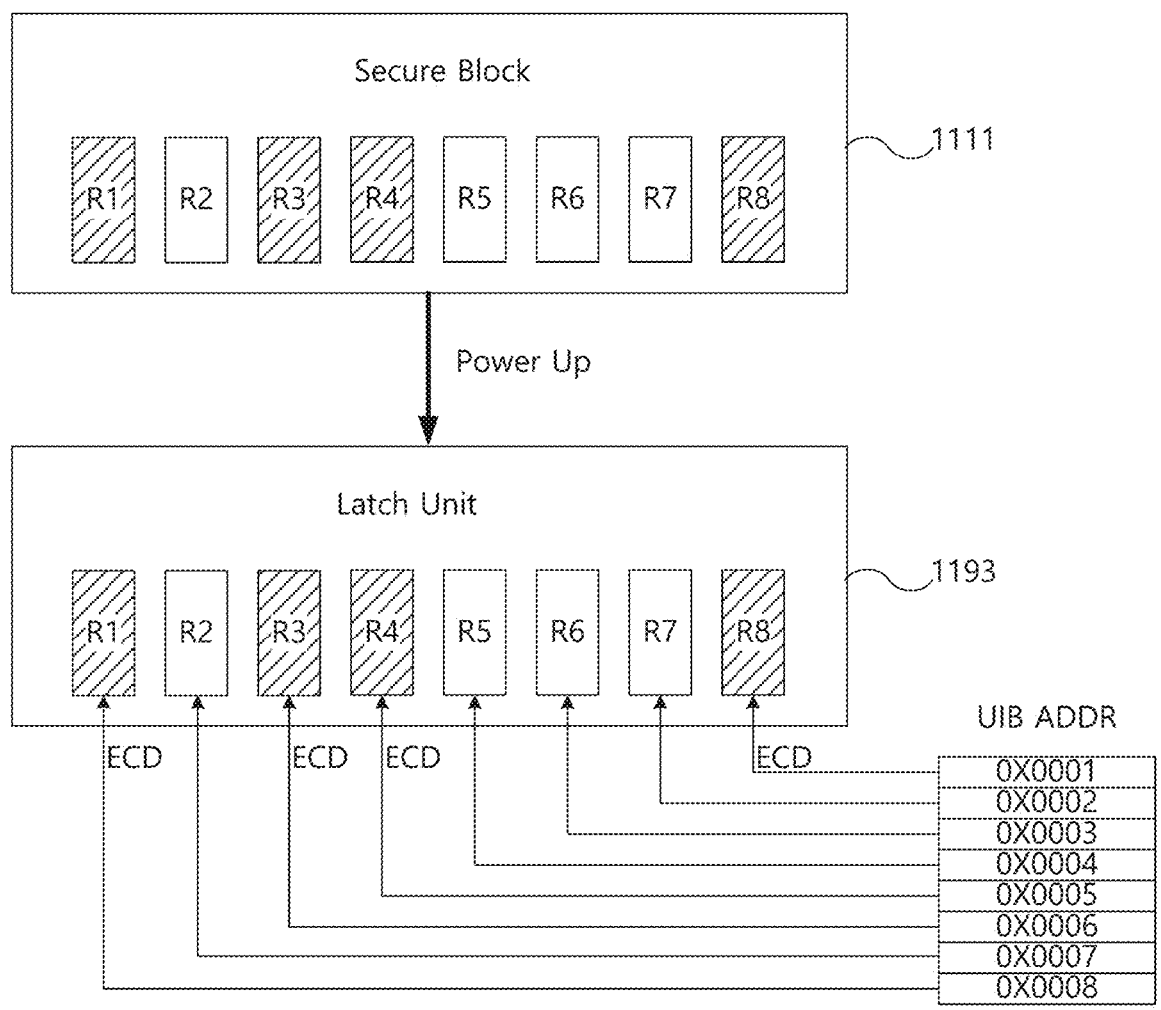
FIG. 38 is a diagram illustrating an example in which erase condition data are updated in the memory device 1100 of FIG. 36.

FIG. 37 is a diagram illustrating an example of the UIB address table manager circuit or UIB address table 1213 stored in the memory controller 1200 of FIG. 35. FIG. 38 is a diagram illustrating an example in which erase condition data are updated in the memory device 1100 of FIG. 36.

Referring to FIGS. 37 and 38, the UIB address table 1213 stored in the memory controller 1200 may include information about all UIB addresses UIB ADDR of the secure block 1111 in the memory device 1100. That is, the information about all the UIB addresses UIB ADDR of the secure block 1111 may be open to the memory controller 1200.

The memory controller 1200 may directly access the UIB address UIB ADDR of the secure block 1111 in the memory device 1100 through the UIB address table 1213. Accordingly, when the changed erase condition is updated, the memory controller 1200 may directly provide the memory device 1100 with the UIB address UIB ADDR targeted for the update of the changed erase condition with reference to the UIB address table 1213.

For example, as illustrated in FIG. 38, it is assumed that the erase condition data are stored in first, third, fourth, and eighth regions R1, R3, R4, and R8 of the secure block 1111. Also, it is assumed that the erase condition data stored in the first, third, fourth, and eighth regions R1, R3, R4, and R8 of the secure block 1111 are loaded to first, third, fourth, and eighth regions R1, R3, R4, and R8 of the latch unit 1193 when the memory device 1100 is powered up.

In this case, the memory controller 1200 may provide the memory device 1100 with UIB addresses UIB ADDR corresponding to the first, third, fourth, and eighth regions R1, R3, R4, and R8. The memory device 1100 may update the changed erase condition data ECD in the first, third, fourth, and eighth regions R1, R3, R4, and R8 of the latch unit 1193 based on the UIB addresses UIB ADDR received from the memory controller 1200.

As described above, all the UIB addresses UIB ADDR of the secure block 1111 in the memory device 1100 may be open to the memory controller 1200, and the memory controller 1200 may update the changed erase condition data ECD in a way to directly send the UIB address UIB ADDR to the memory device 1100.

[Update of Erase Condition when UIB Address of Secure Block is not Open to Memory Controller]

Figure 39:
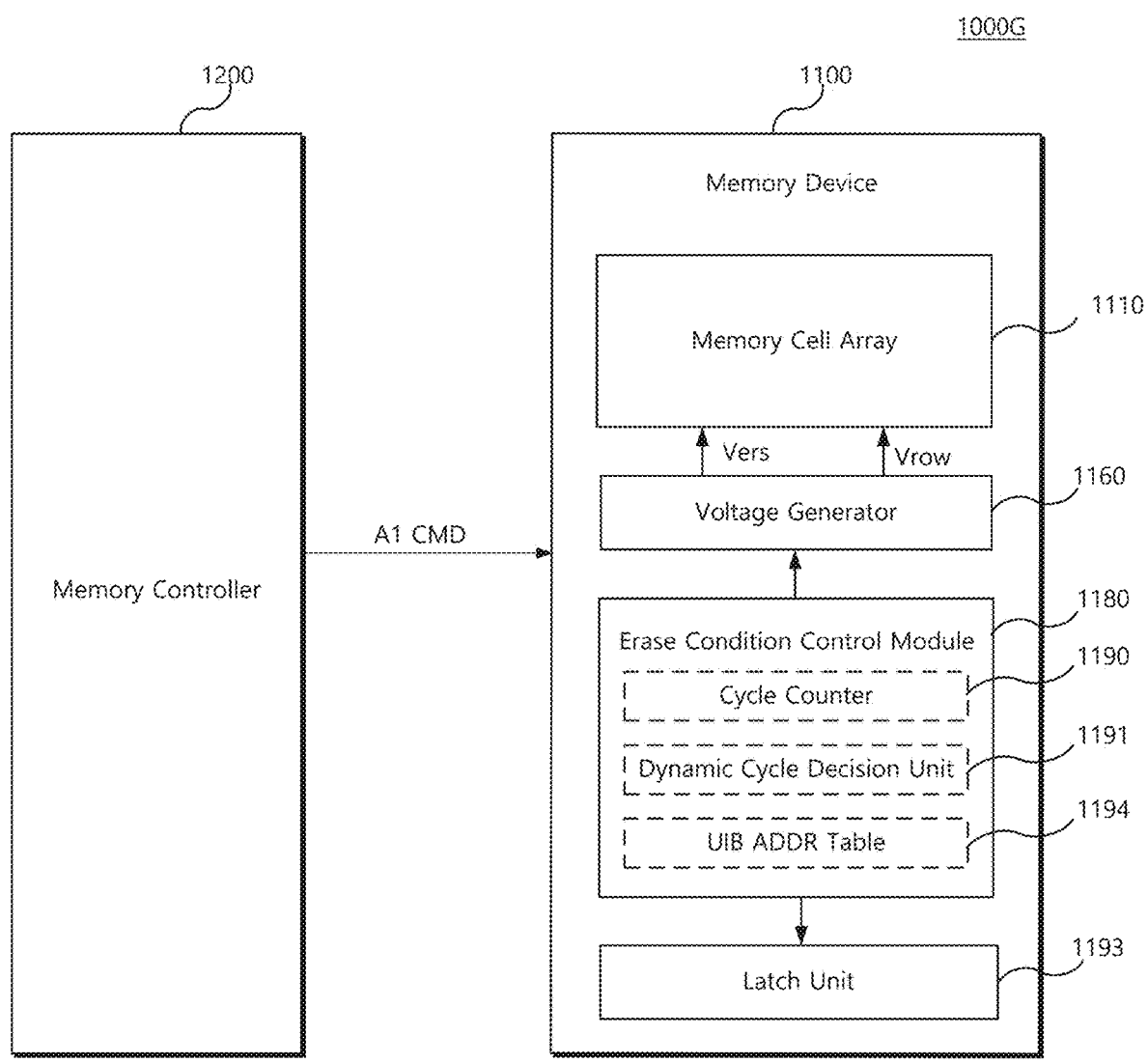
FIG. 39 is a block diagram illustrating a data storage device 1000G according to various example embodiments.
Figure 40:
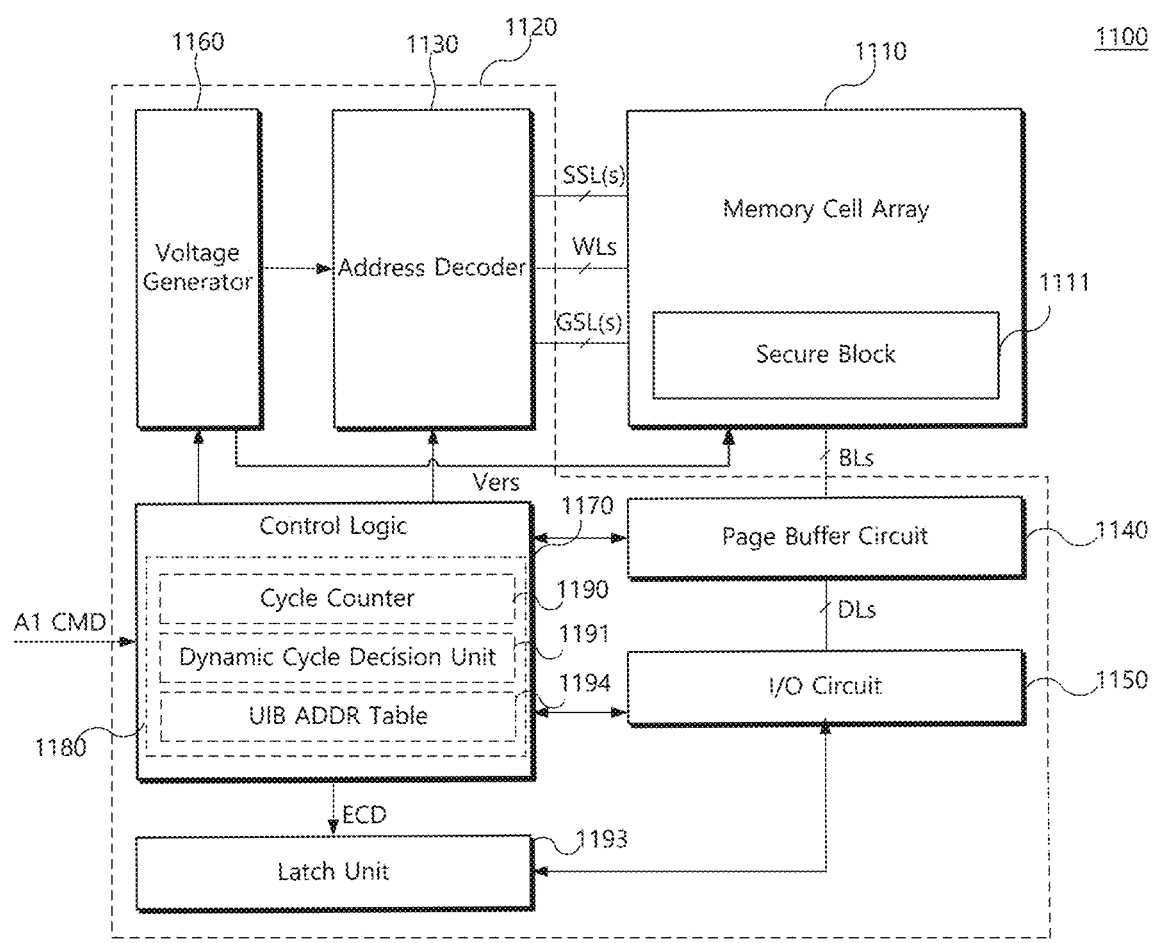
FIG. 40 is a diagram illustrating an example of the memory device 1100 of the data storage device 1000G of FIG. 39.

FIG. 39 is a block diagram illustrating a data storage device 1000G according to various example embodiments. FIG. 40 is a diagram illustrating an example of the memory device 1100 of the data storage device 1000G of FIG. 39. A configuration and an operation of the data storage device 1000G of FIG. 39 is similar to those of the data storage device 1000F of FIG. 35. Accordingly, the same or similar components may be marked by the same or similar reference numerals/signs, and additional description associated with the same or similar components will be omitted to repeated redundancy.

Unlike the data storage device 1000F in which all the UIB addresses of the secure block 1111 are open to the memory controller 1200, no UIB address of the secure block 1111 may be open to the memory controller 1200 of the data storage device 1000G of FIG. 39.

In this case, the memory device 1100 of the data storage device 1000G may determine whether there is a need to change the erase condition and may provide the memory controller 1200 with a flag signal associated with a determination result.

When the change of the erase condition is allowed, the memory controller 1200 may provide the memory device 1100 with an A1 command A1 CMD. The memory device 1100 may update the erase condition in response to the A1 command A1 CMD. To this end, the memory device 1100 of the data storage device 1000G of FIG. 39 may include an UIB address table 1194 and the latch unit 1193.

Below, the description will be given in detail with reference to FIGS. 39 and 40. When the memory device 1100 is powered up, data on the erase condition stored in the secure block 1111 of the memory cell array 1110 may be loaded to the latch unit 1193.

For example, when the number of executed P/E cycles is equal to the pre-determined count or the variation of the threshold voltage of the transistor is greater than the reference value, the memory device 1100 may provide the flag signal to the memory controller 1200. The memory controller 1200 may check that hot carriers are capable of being generated, based on the flag signal; the memory controller 1200 may send the A1 command A1 CMD and may request the memory device 1100 to adjust the erase condition.

The control logic 1170 of the memory device 1100 may receive the A1 command A1 CMD from the memory controller 1200. The control logic 1170 of the memory device 1100 may change the erase condition in response to the A1 command A1 CMD. Also, the control logic 1170 may check memory regions, in which the erase condition data are stored, from among the memory regions included in the latch unit 1193 with reference to the UIB address table 1194. The control logic 1170 may update the data stored in the memory regions so as to be set to the changed erase condition data ECD.

Figure 42:
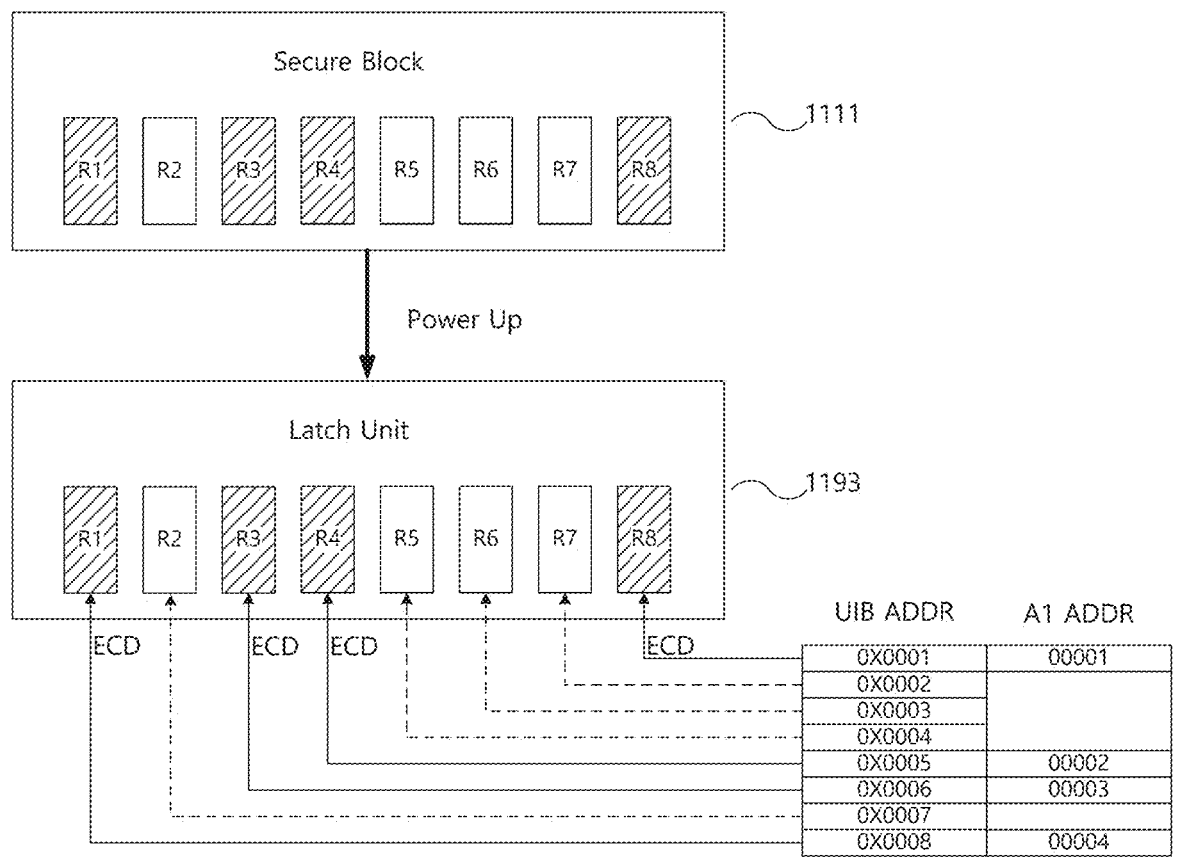
FIG. 42 is a diagram illustrating an example in which erase condition data are updated in the memory device 1100 of FIG. 40.

FIG. 41 is a diagram illustrating an example of the UIB address table 1194 stored in the memory device 1100 of FIG. 40. FIG. 42 is a diagram illustrating an example in which erase condition data are updated in the memory device 1100 of FIG. 40.

Referring to FIGS. 41 and 42, the UIB address table 1194 stored in the memory device 1100 may include information about an UIB address UIB ADDR of the secure block 1111 in the memory device 1100 and information about an A1 address A1 ADDR corresponding thereto. The A1 address A1 ADDR information may correspond to the A1 command.

In this case, only some of all the UIB addresses UIB ADDR may be managed as the A1 address A1 ADDR. That is, the memory controller 1200 may access only an address associated with the erase condition data from among the all the UIB addresses UIB ADDR through the A1 command A1 CMD.

For example, as illustrated in FIG. 42, the memory controller 1200 may be accessible only to the first, third, fourth, and eighth regions R1, R3, R4, and R8 among regions corresponding to all the UIB addresses UIB ADDR through the A1 command A1 CMD, and the changed erase condition data ECD may be updated in the first, third, fourth, and eighth regions R1, R3, R4, and R8 of the latch unit 1193.

As described above, because the access of the memory controller 1200 to an address associated with the erase condition data from among all the UIB addresses UIB ADDR is only allowed, the remaining data other than the erase condition data among the data stored in the secure block 1111 may be safely protected.

A nonvolatile memory device according to various example embodiments may improve reliability by preventing or reducing the likelihood of generation of hot carriers in the GIDL erase operation.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been described with reference to embodiments thereof, it will be apparent to those of ordinary skill in the art that various changes and modifications may be made thereto without departing from the spirit and scope of inventive concepts as set forth in the following claims. Furthermore example embodiments are not necessarily mutually exclusive with one another. For example, some example embodiments may include one or more features described with reference to one or more drawings, and may also include one or more other features described with reference to one or more other drawings.

What is claimed is:

1. A memory device comprising:
   a memory cell array including a plurality of memory blocks;
   a voltage generator configured to generate an erase voltage and row line voltages to be provided to a target block from among the plurality of memory blocks, the target block being a block in which an erase operation is to be performed; and
   control logic configured to control the memory cell array and the voltage generator,
   wherein the voltage generator is configured to provide the erase voltage to at least one of a bit line and a common source line connected with the target block and to provide the row line voltages to row lines connected with the target block, and
   the control logic is configured to change at least one of a slope of the erase voltage or a floating time of at least one row line among the row lines, the change in the slope or in the floating time being dependent on a number of executed program/erase cycles, wherein,
   in response to the number of executed program/erase cycles of the target block being equal to a count, the control logic is configured to decrease the slope of the erase voltage.

2. The memory device of claim 1, wherein the slope of the erase voltage is constant as the erase voltage varies from a minimal value to a maximal value.

3. The memory device of claim 1, wherein,
   in response to the number of executed program/erase cycles of the target block being equal to a first count, the control logic is configured to change the slope of the erase voltage from a first slope to a second slope less than the first slope, and
   in response to the number of executed program/erase cycles of the target block being equal to a second count greater than the first count, the control logic is configured to change the slope of the erase voltage to a third slope less than the second slope.

4. The memory device of claim 1, wherein, in response to the number of executed program/erase cycles of the target block being equal to a count, the control logic is configured to change the floating time of the at least one row line among the row lines from a first floating time to a second floating time that begins earlier than the first floating time.

5. The memory device of claim 4, wherein the row lines include:
   a first gate induced drain leakage (GIDL) line adjacent to the common source line;
   a ground selection line adjacent to the first GIDL line; and
   a dummy word line adjacent to the ground selection line,
   wherein, in response to the number of executed program/erase cycles of the target block being equal to the count, a floating time of the dummy word line is changed from a third floating time to a fourth floating time earlier than the third floating time.

6. The memory device of claim 5, wherein, in response to the number of executed program/erase cycles of the target block being equal to the count, a floating time of the ground selection line is changed from a fifth floating time to a sixth floating time earlier than the fifth floating time.

7. The memory device of claim 6, wherein the fifth floating time and the sixth floating time of the ground selection line are earlier than the third floating time and the fourth floating time of the dummy word line, respectively.

8. The memory device of claim 1, wherein the control logic is configured to change the at least one of the slope of the erase voltage and the floating time of the at least one row line among the row lines based on a variation of a threshold voltage of a transistor according to an execution of a program/erase cycle of the target block.

9. The memory device of claim 8, wherein the control logic is configured to change the slope of the erase voltage and the floating time of the at least one row line among the row lines based on a result of comparing threshold voltages of GIDL transistors connected with the common source line and a reference voltage.

10. The memory device of claim 8, wherein the control logic is configured to generate a comparison result by comparing threshold voltages of GIDL transistors connected with the common source line and a reference voltage after the erase operation and to change at least one of a slope of the erase voltage and a floating time of the at least one row line among the row lines, which are to be applied to a next program/erase cycle, based on the comparison result.

11. The memory device of claim 1, further comprising:
    a latch configured to load secure data from the memory cell array in a power-up operation,
    wherein the control logic is configured to update one or both of data on the slope of the erase voltage or data on the floating time of the at least one row line among the secure data stored in the latch in response to a command received from a memory controller.

12. The memory device of claim 11, wherein the memory controller is configured to operate such that an access of the memory controller to remaining secure data other than the data on the slope of the erase voltage and the data on the floating time of the at least one row line among the secure data is blocked.

13. A data storage device comprising:
    a memory device; and
    a memory controller configured to control the memory device,
    wherein the memory device includes:
    a memory cell array including a plurality of memory blocks;
    a voltage generator configured to generate an erase voltage and row line voltages to be provided to a target block from among the plurality of memory blocks, the target block being a block in which an erase operation is to be performed; and control logic configured to control the memory cell array and the voltage generator, wherein the memory controller is configured to control the memory device such that at least one of a slope of the erase voltage or a floating time of at least one row line among the row lines is changed, wherein the memory device further includes:

a latch configured to load secure data from the memory cell array in a power-up operation, wherein the memory controller includes:

an UIB address table manager circuit configured to manage an UIB address corresponding to a secure block.

14. The data storage device of claim 13, wherein the memory controller includes:

a cycle counter configured to count a number of executed program/erase cycles for each of the plurality of memory blocks; and an erase condition manager circuit, wherein, in response to the number of executed program/erase cycles being equal to a count, the erase condition manager circuit controls the memory device such that at least one of the slope of the erase voltage and the floating time of the at least one row line among the row lines is changed.

15. The data storage device of claim 13, wherein the memory controller includes:

a dynamic cycle decision circuit configured to compare a threshold voltage of a transistor according to execution of a program/erase cycle of the target block with a reference voltage; and an erase condition manager circuit, wherein, in response to the threshold voltage of the transistor being greater than the reference voltage, the erase condition manager circuit controls the memory device such that at least one of the slope of the erase voltage and the floating time of the at least one row line among the row lines is changed.

16. The data storage device of claim 13, wherein the slope of the erase voltage is constant as the erase voltage varies from a minimal value to a maximal value.

17. The data storage device of claim 13, wherein the memory controller is configured to provide the memory device with an UIB address of data on the slope of the erase voltage or an UIB address of data on the floating time of the at least one row line, based on the UIB address table manager circuit.

18. An erase method of a nonvolatile memory device which includes at least one string vertically arranged on a substrate, the method comprising:

selecting a target block, in which an erase operation is to be performed, from among a plurality of memory blocks;

changing an erase condition to a changed erase condition based on a number of executed program/erase cycles of the target block; and performing an erase operation on the target block based on the changed erase condition, wherein the changing of the erase condition includes:

comparing threshold voltages of GIDL transistors connected with a common source line from among transistors of the target block with a reference voltage; and changing at least one of a slope of an erase voltage or a floating time of at least one row line among row lines of the target block, based on a result of comparing the threshold voltages of the GIDL transistors and the reference voltage.

19. The method of claim 18, wherein the changing of the erase condition includes:

comparing the number of executed program/erase cycles of the target block with a count; and when the number of executed program/erase cycles of the target block is equal to the count, changing at least one of a slope of an erase voltage or a floating time of at least one row line among row lines of the target block.

20. The method of claim 18, wherein the slope of the erase voltage is constant as the erase voltage varies from a minimal value to a maximal value.

\* \* \* \* \*